US007190725B2

(12) United States Patent
Pirim

(10) Patent No.: US 7,190,725 B2
(45) Date of Patent: *Mar. 13, 2007

(54) SYSTEM AND METHODS FOR SMOOTHING AN INPUT SIGNAL

(76) Inventor: Patrick Pirim, 56, rue Patay, Paris (FR) 75013

(*) Notice: Subject to any disclaimer, the term of this patent is extended or adjusted under 35 U.S.C. 154(b) by 581 days.

This patent is subject to a terminal disclaimer.

(21) Appl. No.: 10/189,281

(22) Filed: Jul. 3, 2002

(65) Prior Publication Data

US 2003/0067978 A1     Apr. 10, 2003

Related U.S. Application Data

(63) Continuation of application No. 09/230,502, filed on Jan. 26, 1999, now Pat. No. 6,486,909.

(30) Foreign Application Priority Data

Jul. 26, 1996  (FR) ................................. 96 09420
Jul. 22, 1997  (WO) ...................... PCT/FR97/01354

(51) Int. Cl.
*H04N 7/12*    (2006.01)
(52) U.S. Cl. ............................. 375/240.27; 375/240.29
(58) Field of Classification Search ........... 375/240.27, 375/240.29; 382/237, 264, 268, 275; 348/575, 348/576, 607, 671, 672, 701
See application file for complete search history.

(56) References Cited

U.S. PATENT DOCUMENTS 4,783,828 A    11/1988  Sadjadi 5,008,946 A    4/1991   Ando (Continued)

FOREIGN PATENT DOCUMENTS

EP           0 046 110 A1    2/1982

(Continued)

OTHER PUBLICATIONS

Stephane G. Mallat, "A Theory for Multiresolution Signal Decomposition: The Wavelet Representation", IEEE Transactions on Pattern Analysis and Machine Intelligence, vol. 11, No. 7, Jul. 1989, pp. 674-693.

(Continued)

*Primary Examiner*—Vu Le
(74) *Attorney, Agent, or Firm*—Akerman Senterfitt

(57) ABSTRACT

A process and a device operating in real time for identifying and localizing an area in relative movement in a scene and determining the speed and oriented direction of the relative movement in real time. The process carries out temporal processing of a digital video input signal S(PI) that includes deducing, from the variations between the value of each pixel in a frame and in the immediately preceding frame, a binary signal DP identifying whether or not there was a significant variation and a digital signal CO representing the magnitude of this variation, and a spatial processing including distributing in a matrix these two signals successively for a single frame that is scanned through the matrix, and deducing the required relative movement and its parameters from this matrix distribution. The device includes a temporal processing unit associated with a memory and a spatial processing unit associated with a delay unit, a clock unit and control unit to control the rate of operation of the temporal and spatial processing units.

17 Claims, 10 Drawing Sheets

U.S. PATENT DOCUMENTS

| | | | |
|---|---|---|---|
| 5,088,488 A | | 2/1992 | Markowitz et al. |
| 5,109,425 A | * | 4/1992 | Lawton .................. 382/1 |
| 5,163,095 A | | 11/1992 | Kosaka |
| 5,278,921 A | | 1/1994 | Nakamura et al. |
| 5,359,533 A | | 10/1994 | Ricka et al. |
| 5,384,865 A | * | 1/1995 | Loveridge ................ 382/54 |
| 5,488,430 A | | 1/1996 | Hong |
| 5,565,920 A | | 10/1996 | Lee et al. |
| 5,592,226 A | | 1/1997 | Lee et al. |
| 5,592,237 A | | 1/1997 | Greenway et al. |
| 5,625,717 A | | 4/1997 | Hashimoto et al. |
| 5,694,495 A | | 12/1997 | Hara et al. .............. 382/324 |
| 5,712,729 A | | 1/1998 | Hashimoto ............... 259/562 |
| 5,774,581 A | | 6/1998 | Fassnacht et al. |
| 5,793,888 A | | 8/1998 | Delanoy .................. 382/219 |
| 5,896,489 A | * | 4/1999 | Wada .................... 358/1.2 |
| 6,256,608 B1 | | 7/2001 | Malvar |
| 6,304,187 B1 | | 10/2001 | Pirim |
| 6,486,909 B1 | | 11/2002 | Pirim |
| 6,577,774 B1 | * | 6/2003 | Asada .................... 382/264 |
| 6,583,823 B1 | * | 6/2003 | Shimada et al. .......... 348/616 |
| 6,597,738 B1 | | 7/2003 | Park et al. |
| 6,665,447 B1 | * | 12/2003 | Chan .................... 382/254 |
| 6,717,518 B1 | | 4/2004 | Pirim |
| 2002/0071595 A1 | | 6/2002 | Pirim |
| 2002/0101432 A1 | | 8/2002 | Ohara et al. |
| 2002/0120594 A1 | | 8/2002 | Pirim |
| 2002/0156753 A1 | | 10/2002 | Pirim |
| 2002/0169732 A1 | | 11/2002 | Pirim |
| 2003/0152267 A1 | | 8/2003 | Pirim |

FOREIGN PATENT DOCUMENTS

| | | |
|---|---|---|
| EP | 0 380 659 A1 | 8/1990 |
| EP | 0 394 959 A2 | 10/1990 |
| EP | 0 394 959 A3 | 10/1990 |
| FR | 2 611 063 A1 | 8/1988 |
| FR | 2 751 772 A1 | 1/1998 |
| JP | 06-205780 A | 7/1994 |
| WO | WO 98/05002 | 2/1998 |
| WO | WO 99/36893 A1 | 7/1999 |
| WO | WO 99/36894 A1 | 7/1999 |
| WO | WO 00/11609 A1 | 3/2000 |
| WO | WO 00/11610 | 3/2000 |
| WO | WO 00/11610 A1 | 3/2000 |
| WO | WO 01/63557 A2 | 8/2001 |

OTHER PUBLICATIONS

John. G. Daugman, "Complete Discrete 2-D Gabor Transforms by Neural Networks for Image Analysis and Compression", IEEE Transaction on Acoustics, Speech snd Signal Processing, vol. 36, No. 7, Jul. 1988, pp. 1169-1179.

Giacomo Indiveri et al., "System Implementations of Analog VLSI Velocity Sensors", 1996 IEEE Proceedings of MicroNeuro '96, pp. 15-22.

Pierre-Francois Rü edi, "Motion Detection Silicon Retina Based on Event Correlation", 1996 IEEE Proceedings of MicroNeuro '96, pp. 23-29.

Revue Trimestrielle Des <<Techniques de Lingenieur>>, "Instantanés Technique"Techniques De ingénieus, Mar. 1997-N°5 (40F), ISSN 0994-0758.

Es Professionnels de Linformatique En Entreprise Magazine, "Objectif Securite Des Reseaux", N° 24, Jan. 1997.

Electronique International Hebdo, Dec. 5, 1996-N° 245, "Premier . . . oeil", Francoise Gru svelet (with translation).

Nabeel Al Adsani, "For Immediate Release The Generic Visual Perception Processor", Oct. 10, 1997, p. 1.

Colin Johnson, "Vision Chip's Circuitry Has Its Eye Out For You", http://192.215.107.74/wire/news/1997/0913vision.html, pp. 1-3.

The Japan Times, :"British firm has eye on the future", Business & Technology, Tuesdsay, Nov. 18. 1997, 4th Edition.

Inside the Pentagon's, Inside Missle Defense, and exclusive biweekly report on U.S. missle defemse programs, procurement and policymaking, "Missile Technology" vol. 3, No. 16—Aug. 13, 1997, p. 5.

Electronique, "Le Mechanisme de la Vision Humaine Dans Le Silicium", Electronique Le Mensuel Des Ingenieurs De Conception, No. 68, Mar. 1997, ISSN 1157-1151 (with translation).

"Elecktronik Revue" ER, Eine Elsevier-Thomas-Publikation, Jahrgang 8, Mar. 1997, NR.3, ISSN0939-1134.

"Un Processor de Perception Visuelle", LehAUT pARLEUR, 25F Des solutions électroniques pour tous, N° 1856, Jan. 15, 1997 (with translation).

"Realiser Un Decodeur Pour TV Numberique", Electronique, Le Mensuel Des Ingenieurs De Conception, No. 66, Jan. 1997.

Groupe Revenu Français, Air & Cosmos Aviation International, "Un Calculateur De Perceoption Visuelle", Hebdomadaire, vendredi Dec. 6, 1996, 34 Année, No. 1590, 22F.

Tomita A et al.: "Hand Shape Extraction From A Sequence of Digitized Gray-Scale Images." Proceedings of the International Conference on Industrial Electronic Control and Instrumentation. (IECON), Bologna, Sep. 5-9, 1994, Special Sessions. Singnal Processing and Control.

Yamada and Ito, 1994, "Image understanding based on edge histogram method for rear-end collision avoidance system," *Vehicle Navigation& Information System Conference Proceedings*, IEEE. pp. 445-450.

* cited by examiner

SYSTEM AND METHODS FOR SMOOTHING AN INPUT SIGNAL

The purpose of this invention is a process and device for identifying and localizing an area in relative movement in a scene and for determining the speed and oriented direction of this relative movement, in real time.

Relative movement means a movement of said area, (which may be composed of an "object" in the broadest sense of the term including a living being or a portion of a living being, for example a hand) in an approximately motionless environment, or more or less complete immobility of said area (or "object") in an environment that is at least partially in movement.

The invention relates to the processing of a digital video output signal from an observation system composed of an optical input system or objective capable of forming an image of the observed scene, and by an optoelectronic conversion system or sensor capable of converting said image that it receives into a digital output signal.

In general, the observation system is composed of a video camera or camescope that observes the scene to be monitored (said digital output signal then being composed of the digital video signal output by a camera with a digital output or of the output of an analog/digital converter, the input of which is connected to the output of a camera outputting an analog video signal.

The observation system may also be composed of the objective of an optical instrument (binoculars, sighting refracting instrument, view-finder), from which at least a portion of the outgoing light beam is sampled and by a photoelectronic sensor, for example of the CCD or CMOS type, with the normal associated electronic system, sensor receiving the image formed by said portion of the light beam and converting it through the associated electronic system into a digital video output signal.

The invention consists mainly of processing the digital video output signal from an observation system, particularly a video camera, with a digital output to determine signals signaling the existence and localization of an area in relative movement in said scene, and the speed and oriented direction of the displacement if said area is actually moving in said scene relatively to an, approximately motionless environment, in real time.

The best system yet developed for identifying and localizing an object in relative movement and for determining its speed and oriented direction of displacement is animal or human sight, for example a hunter in his hide localizing the displacement of an animal, and the direction and speed of this displacement.

Prior art surveillance devices like artificial retinas, either analog (Giocomo Indiveri et al, in Proceedings of MicroNeuro'96 pp 15 to 22), or digital (Pierre-Franqois Rüedi in Proceedings of MicroNeuro'96 pp 23 to 29), have been proposed, but the first article deals with detectors and analog units with complex structures, and the second article deals with means of identifying the edges of an object; furthermore, very fast and high capacity memories are used in the devices described in order to operate in real time, and limited information is obtained about moving areas or objects.

Thus the suggestion was made of memorizing a frame output signal from a video camera, or similar instrument, composed of a sequence of data relative to pixels representative of the scene observed by the camera at time $t_0$ in a first two-dimensional memory, and then the video signal for the next corresponding frame representing said scene at time $t_1$, in a second two-dimensional memory. If an object has moved between $t_0$ and $t_1$, on the one hand, the distance d by which the object has moved in the scene between $t_1$ and $t_0$ and, on the other hand, the time $T=t_1-t_0$ between the beginnings of two successive corresponding frames relative to the same pixels are determined. The displacement speed is then equal to d/T. This type of system requires a very large total memory capacity if it is required to obtain precise, speed and oriented direction indications characterizing the displacement. Furthermore, there is some delay in obtaining the speed and displacement direction indications; this information is not available until time $t_1+R$, where R is the time necessary for the calculations for the period $t_0-t_1$. These two disadvantages (the need for a large memory capacity and the delay in obtaining the required information) limit applications of this type of system.

Furthermore, French patent No. 2.611.063, of which one of the inventors (Mr. Patrick Pirim) is the inventor of the present invention, describes a process and a device for real time processing of a sequenced data flow, composed in particular of the output signal from a camescope, in order to perform data compression. According to this prior patent, the histogram of signal levels is formed using a classification law for a first sequence, the representative Gauss function associated with this histogram is memorized and the maximum and minimum levels are extracted from it, the levels of the next sequence or second sequence are compared with said signal levels for the first sequence memorized with a constant time constant identical for each pixel, a binary classification signal is generated that characterizes the next said sequence with reference to the classification law, an auxiliary signal is generated from this binary signal representative of the duration and position of a range of significant values, and finally said auxiliary signal is used to generate a signal localizing the range with the longest duration, called the dominant range, and these operations are repeated for subsequent sequences of the sequenced signal. This process and this device of classification enable data compression, keeping only interesting parameters in the processed flow of sequenced data. In particular, this process is capable of processing a digital video signal representative of a video image in order to extract and localize at least one characteristic of at least one area in said image. It is thus possible to classify brightness and/or chrominance levels of the signal and to characterize and localize an object in the image.

U.S. Pat. No. 5,488,430 detects and estimates a displacement by determining horizontal and vertical changes in the image of the observed area separately. Difference signals are used to detect movements from right to left or from left to right, or from top to bottom or bottom to top, in the horizontal and vertical directions respectively, firstly by carrying out the EXCLUSIVE OR logical function on horizontal/vertical difference signals and frame difference signals, and secondly by using a ratio of the sums of horizontal/vertical signals and the sums of frame difference signals with respect to a K×3 window. In this U.S. Pat. No. 5,488,430, calculated values of the image along two orthogonal horizontal and vertical directions are used with an identical repetitive difference K in these two orthogonal directions, this difference K being defined as a function of the displacement speeds that are to be determined. The device according to this US patent determines the direction of movements along each of the two orthogonal directions by applying a set of calculation operations indicated in columns 12 (at the beginning and end) and 13 (at the beginning) to the difference signals, which requires very complex (and therefore difficult to execute) electronic computing units performing particularly division, multiplication and summation; furthermore, additional complex computing units are necessary to obtain the speed and oriented direction of displacement (extraction of square root to obtain the amplitude of the speed and calculation of the arctan function to obtain the oriented direction), starting from projections on the two horizontal and vertical axes Finally U.S. Pat. No. 5,488,430 does not include any means of smoothing pixel values by means of a time constant, variable for each pixel, in order to compensate for excessively fast variations of these values.

On the contrary, the process according to the invention is embodied by using a digital type of device, object of the invention, which has a relatively simple structure and a relatively small memory capacity, and by which the required information can be obtained quickly with a wide variety of results and applications (corresponding to a complete half-image for interlaced frames or a complete image, depending on the application).

An article by Alberto Tomita Sr. and Rokuya Ishii, entitled "Hand Shape Extraction from a Sequence of Digitized Gray-Scale Images" in Institute of Electrical and Electronics Engineers, vol. 3, 1994, p 1925–1930, implements a movement detection by subtraction between successive images followed by the formation of histograms based on the shape of a human hand in order to extract the shape of a human hand in a digitized scene. The histogram analysis is based on a gray scale inherent to the human hand. It does not include any means of forming histograms of the plane coordinates. The sole purpose of the authors of this article is to detect the displacements of a human hand, for example in order to replace the normal mouse by a hand, the displacements of which are identified, for inputting data into a computer.

On the contrary, the present invention is not limited to detecting the displacement of a hand, but is capable of detecting the relative displacement of any object (in the widest sense of the term) in a scene, and does not use histograms based on the gray values of a hand, but rather the histograms of some particular digital variables representative of the displacement (if any) and histograms of plane coordinates.

According to this invention:
a digital video output signal from an observation system is processed, this signal being composed of a sequence of frames (corresponding to a half-image in the case of two interlaced frames per image or to a complete image in the case of a single frame per image) in the known manner, each consisting of a given number of successive lines, and a given number of pixels or image points in each of these lines,
in order to obtain, using a relatively small memory capacity, signals capable of indicating if there is an area in relative movement in the observed scene and, if so, to specify the localization, and speed and oriented direction of said area if it is actually moving with respect to its environment,
by generating two digital signals, one characteristic of the significant variation or non-variation of the pixel signal, for the same pixel location, between two successive corresponding frames, and the other characteristic of the amplitude of this variation, if any, and performing a matrix distribution of these two signals for the pixels in a portion of a frame at a same instant.

It is a first object of the invention to provide a process operating in real time for identifying and localizing an area in relative movement in a scene observed by an observation system with an output constituted by a digital video signal of the type comprising a succession of corresponding frames, each composed of a succession of lines, each composed of a succession of pixels, and for determining the speed and oriented direction of the displacement, said process being characterized in that it consists in carrying out the following sequence of operations on the digital video, output signal:

a smoothing processing on said digital video output signal using a digital time constant, the numerical value of which may be modified independently for each pixel of said output signal, a memorization, on the one hand, of a frame of said output signal after smoothing and, on the other hand, of the smoothing time constant associated with said frame, a temporal processing for each pixel position, consisting in determining firstly the existence, and secondly the amplitude of a significant variation in the amplitude of the pixel signal between the current frame and the immediately preceding smoothed and memorized frame, and generating two digital signals, the first signal being a binary, or single bit, signal with two possible values, one of which represents the presence and the other represents the absence of a significant variation between two successive frames, the value of said binary signal modifying the memorized value of said time constant in order to reduce it if said signal represents a significant variation and in order to increase it if said signal does not represent such a variation, the reduction or increase being done in a quantified manner, whereas the second digital signal, i.e. the amplitude signal, is a multibit signal with a limited number of bits quantifying the amplitude of this variation; and a spatial processing consisting of the following steps for each frame of the digital video input signal:
distributing only the values of a fraction of the pixels in a frame at a given observation instant (a fraction which is scanned across said matrix throughout the duration of the frame) firstly of said binary signal and secondly of said digital amplitude signal, into a matrix with a number of rows and, columns that is small compared with the number of lines and the number of pixels per line in the video signal, respectively, in order to characterize the values of the pixels,
determining in this double instantaneous matrix representation, a particular area in which said binary signal has the value sought for, representing the presence or absence of a significant variation, and said digital amplitude signal varies, or does not vary, by a significant value for adjacent pixels in the matrix along an oriented direction starting from an origin pixel, within the same portion of the frame and therefore at the same observation instant, and
generating signals representing the existence and localization of the area in relative displacement and the relative inter-frame speed and the oriented direction of this displacement, if any, relative to its environment, inferred from the instantaneous matrix distribution of these two binary and amplitude digital signals.

Preferably, the process according to the invention is characterized in that it also consists of:
forming firstly histograms of the signal values distributed in matrices, and secondly histograms of the inclinations of two coordinate axes, with variable slope, in a plane,
identifying a domain in which there is a significant variation of the processed values in each histogram formed, and for each identified domain, deducing whether or not there is an area in relative movement, and if so its localization, speed and oriented direction.

In specific embodiments:

said matrix is a square matrix with the same odd number of rows and columns (2l+1), and nested matrices containing 3×3, 5×5, 7×7, . . . (2l+1)×(2l+1) elements, centered on the center of this square matrix, are considered in order to determine the smallest nested matrix in which said digital signal varies along an oriented direction starting from said center, the value of said binary signal showing that the threshold limit along this direction has been exceeded, said matrix is a hexagonal matrix, and nested hexagonal matrices of increasing size, centered on the center of this hexagonal matrix, are considered, in order to determine the smallest nested matrix in which said digital signal varies along an oriented direction, said matrix is an inverted L matrix with a single row and a single column, and nested matrices containing 3×3 pixels, 5×5 pixels, 7×7 pixels, . . . (2l+1)×(2l +1) pixels are considered for the single row and the single column, in order to determine the smallest matrix in which the signal varies along an oriented direction, namely the line with the steepest slope and constant quantification.

Advantageously, said time constant is of the form $2^p$, where p is a number less than 16, and which can then be expressed in not more than 4 bits, the time constant being reduced or increased by subtracting or adding one unit to p.

In this case, if it is required, successive decreasing portions of complete frames are considered using the Mallat time-scale algorithm and the largest of these portions, which gives displacement, speed and orientation indications compatible with the value of p, is selected.

Another object of the invention is a device operating in real time for identifying and localizing an area in relative movement in a scene observed by an observation system with an output constituted by a digital video signal of the type comprising a succession of corresponding frames, successive lines in each corresponding frame and successive pixels in each line, and for determining the speed and oriented direction of the displacement, by using the process described above, said device receiving said video output signal as input and being characterized in that it comprises in combination:

means for smoothing said digital video output signal making use of a digital time constant, the numerical value of which may be modified independently for each of said output signal pixels;

means for memorizing firstly a frame of said output signal after smoothing and secondly the smoothing time constant associated with said frame, a temporal processing unit to analyze the variations with time of the amplitude of the pixel signal, for the same pixel position, between the current frame and the immediately preceding smoothed and memorized frame of said digital signal, said unit comprising a memory capable of receiving, storing and retrieving information about the corresponding previous smoothed frame, together with means of comparison to determine if the absolute value of the difference, between the current pixel signal and a representative value of the pixel signal for the same pixel position in the previous frame stored in said memory, exceeds or does not exceed a threshold, for each position of the pixel in the input video signal frame, by generating a binary, or single bit, signal with two values, one of these two values showing that the threshold is exceeded and the other showing that it is not exceeded, and computing means capable of determining a multibit digital amplitude signal with a small number of bits, the value of which depends on the amplitude of the variation in the value of the same pixel between the current frame and the immediately preceding, smoothed and memorized, frame of the digital video signal; and a spatial processing unit, into which the outputs from said successive binary and digital amplitude signals for the pixels in a given frame produced by the temporal processing unit are input, said spatial processing unit comprising means for characterizing the amplitude values of the pixels, these means distributing only said binary and digital amplitude signals relative to the same instant, i.e. to a single frame, into a matrix with fewer rows and columns than the number of lines and the number of pixels per line respectively in a frame of said digital video signal, the frame being scanned across said matrix throughout the duration of a frame, spotting means for determining an area of pixels within said matrix in which, at this instant, the binary signal has the searched value, and means of determining an area of pixels in said matrix, into which, at the same instant, the digital amplitude signal for adjacent pixels varies by a significant quantity, and means which, in response to the indications from the two preceding means, generate signals representing this area of pixels and therefore the existence and localization of an area in relative movement within the observed scene and the relative inner-frame speed and oriented direction of this area when it actually moves relative to its environment.

Preferably, the spatial processing unit will also include an output delivering a delayed digital video signal consisting of the input digital video signal with a delay equal to the duration of the rows of a matrix minus the duration of a row, in order to supply an output signal contemporary with the analysis of the matrix in said temporal processing unit.

Preferably, the spatial processing unit of the device according to the invention, includes delay means in cascade, each of which imposes a delay equal to the time difference between the beginning of two successive lines, and delay means in cascade for each line, each importing a delay equal to the time difference between two successive pixels in a line, the outputs from all registers and the input to the first registers on each line delivering at a given instant the values of said binary signal and said digital amplitude signal at the same instant, to said identification means.

Advantageously, the device according to the invention also comprises means for forming histograms of the output values from said spatial processing unit, and histograms of the inclinations of two, variable slope, coordinate axes within a plane, means for identifying a domain, in each histogram, in which there is a significant variation in the processed value, in order to validate this domain at their output, and to deduce, for all histograms, output signals that identify and localize an area of relative movement in the observed scene, if any, and the speed and oriented direction of this movement if said area is effectively moving with respect to its environment.

If it is required to detect the movement of an object in an approximately motionless environment, it is necessary to determine the part of the matrix in which the value of the binary signal shows that the limit has been exceeded and at the same time the digital amplitude signal varies by a significant value between adjacent pixels in a frame.

On the contrary, if it is required to detect a motionless object in an environment that is effectively in motion, it is necessary to determine the part of the matrix in which the value of the binary signal shows that the limit has not been exceeded and at the same time the digital amplitude signal does not vary between adjacent pixels in a frame.

Preferably in the device for identifying, localizing and determining the speed and oriented direction of displacement of an area in relative movement in a scene, embodying the above mentioned process:

said smoothing means include an input receiving said digital video signal and derive, for each successive pixel in a frame of said video signal, a smoothed signal in which the temporal variations of the input digital video signal are reduced by using a threshold signal received on another input and a time constant related to each pixel position in a frame, the value of which is modified successively so that the smoothing maintains, although reduced, the trend in the variations of the incoming digital video signal, said smoothing means working in cooperation with said memory unit that receives, stores and retrieves the updated values of the smoothed signal and of said time constant, for each portion of pixels in a frame, and output, for each pixel position, at least the succession of values of the updated time constant and of the values of the binary signal that shows whether or not said threshold is exceeded by the absolute value of the difference between the value of the pixel and its smoothed value; said spatial processing assembly carrying out the matrix distribution along lines and columns in a reduced number, of the outputs from said smoothing means, namely the successive values of the time constant and of said binary signal;

means are provided for identifying, in said matrix distribution, an area of pixels in which simultaneously:

either the value of said binary signal corresponds to a threshold being exceeded and said time constant varies between adjacent pixels by a significant value in one direction and for producing output signals indicating the localization of said area and the speed and oriented direction of displacement in this area;

or the value of said binary signal corresponds to a limit not being exceeded and said time constant does not vary between adjacent pixels and for producing output signals indicating the localization of said area.

In the preferred embodiments:

said smoothing means include, in combination with a video memory or field memory that stores successive values, for each pixel in the frame, of said time constant and the smoothed digital video signal, means for calculating, for each pixel, the absolute value of the difference between the value of the digital video signal output from the camera and the value of the previously smoothed digital video signal, means for comparing said difference with a threshold, and for generating a binary signal, one of the two values of which indicates that said limit has been exceeded and the other value indicates that it has not been exceeded; means for updating the time constant receiving the immediately preceding value of the time constant from said memory and reducing it if it receives a binary signal with a value showing that the limit has been exceeded, or increase it if the value of the binary signal indicates that it has not been exceeded, the reduction or increase being however not performed if it would lead respectively to a negative value or to a value exceeding a threshold value, and means for updating the smoothed value of the digital video signal that algebraically add, to the prior value of this smoothed signal received from said memory, the quotient of the difference between the digital video signal output from the camera and the previous smoothed digital video signal from said memory by a factor equal to value of the previous time constant retrieved by from said memory;

said time constant is in the form $2^p$, where p is an integer less than 16, and which can therefore be represented by not more than 4 bits, the reduction or increase in the time constant being done by subtracting or adding one unit to p;

said matrix distribution means include in combination with delay means applying successive delays, equal to the duration of one line of the video signal, to the digital video signal originating from the camera so as to deliver on successive outputs this video signal delayed by one delay period, two delay periods and so on, up to a number of delay periods equal to the number of lines in the spatial distribution matrix minus one, means for performing a matrix distribution along successive rows of the matrix receiving firstly, the digital video signal from the camera without a delay and this progressively delayed signal output from the delaying means outputs and secondly, values of the time constant and said binary signal received from said smoothing means in order for producing a matrix distribution, in rows and columns, of said values, at a given instant, of the time constant and binary signal for pixels in a portion of the frame of the digital video signal with the same size as the matrix;

the matrix distribution means comprise a series of digital signal conductors, i.e. one for each row in the distribution matrix, each with series-connected shift registers, each imposing a delay equal to the time difference between two successive pixels in a line of the digital video signal, the position of a pixel distributed in the matrix being determined by a point in the matrix located before a delay register, the number per line thereof being equal to the number of columns in the matrix minus one, and by a point downstream the furthest downstream register;

said means of detecting a moving area in said matrix, by detecting the simultaneous presence of a value of the binary signal indicating that a limit was exceeded and a variation in the value of the time constant, include means for determining, along discrete digitized oriented directions, the slope of the variation in the value of the time constant close to a pixel at the center of said matrix, forming the origin for said directions, and means for selecting the steepest slope of this variation close to this center-origin and determining the oriented direction, taking account of a selection criterion for selecting the direction if there is more than one direction with same maximum slope of this variation, these latter means outputting signals representative of the speed and oriented direction of the displacement in the moving area, with a validation signal indicating that these speed and direction signals are validated, together with the value of the time constant.

Preferably, if included in the device according to the invention, the means for creating the histograms each include:

inputs receiving the signal from which the histogram is formed and a validation signal originating from the matrix distribution means; and means for establishing two linear unidimensional histograms for the two plane coordinates and for combining these two linear histograms into a surface histogram representing the area in which there is a significant variation in the input signal, and an output delivering a signal representative of said area.

Furthermore, the means for forming the histograms preferably include:

means for calculating a reference change, the inputs of which receive a line sequence signal, a column sequence signal and a pixel clock signal and the output of which is representative of the reference change;

two means for forming histograms for two axes, receiving the two reference signals and forming histograms of these axes; and area means into which the outputs from the two histogram formation means for the two axes are input, and which output a signal containing global slope information for the two axes.

In some applications, said time constant may be composed of the order number of the intervals, in limited number and with a gradually increasing magnitude, into which the absolute value of the difference between the value of the current pixel and the immediately preceding value of the same pixel after smoothing is divided, for each pixel position.

Advantageously, for determining the binary signal of overshooting, or not overshooting, of the threshold the absolute value of the difference between the value of the current input pixel and the immediately preceding smoothed value of the same pixel originating from the memory in compared with a threshold value, for each pixel position.

As concerns the digital amplitude signal, it is preferably generated as an integer representing the tendency of the value of the current pixel to approach the immediately preceding smoothed value of this pixel, for each pixel position.

One of the characteristics of the invention consists of the fact that, for determining both the binary signal and the digital amplitude signal, use is made, as value of the immediately preceeding pixel, of a stored smoothed value thereof, in order to reduce any excessive variations of this pixel signal with time that may exist in the digital video input signal originating from the video camera or any other observation device with a digital output.

It is known that the effect of a smoothing operation is to gradually substitute, for a digital signal with large amplitude variations with time, a signal with smaller variations and therefore more easily quantifiable with a small number of steps, and therefore bits, in the smoothed digital amplitude signal.

We will now describe a preferred embodiment, given for illustrative purposes and in no way limitative, of a device according to the invention embodying the process according to the invention, with reference to the appended drawings.

Figure 8:
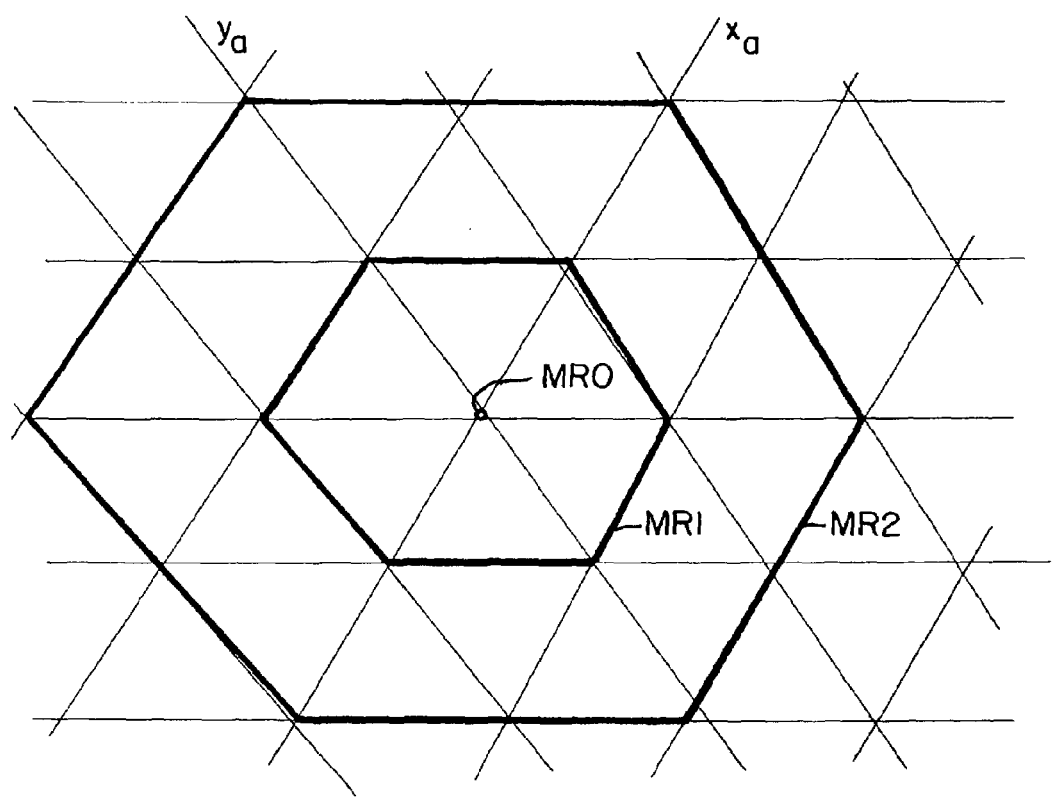
Figure 9:
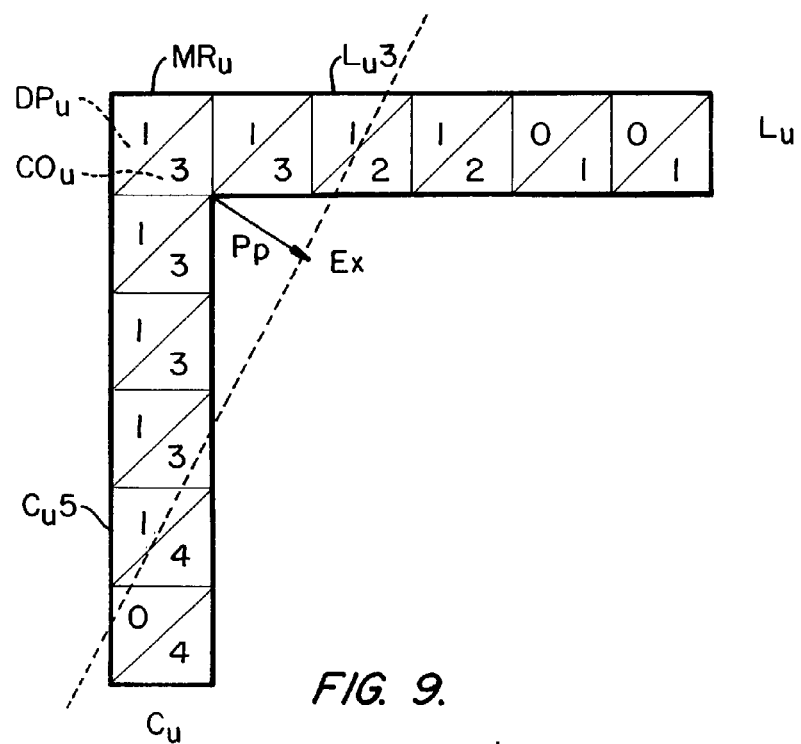

FIGS. 8 and 9 describe two other types of matrix, namely hexagonal and reverse L matrices respectively.

Figure 2:
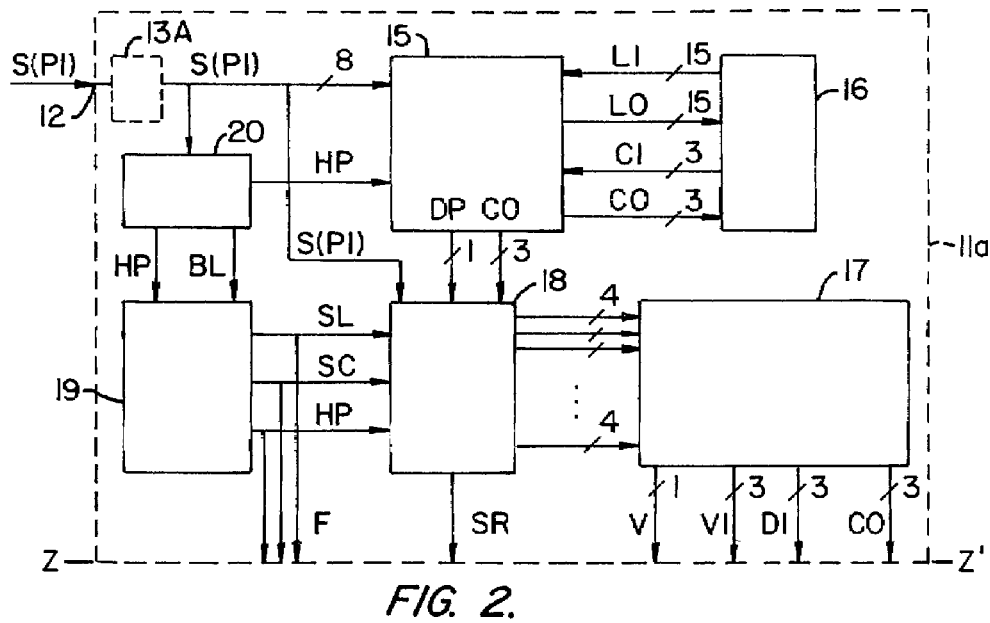
FIG. 2 represents, with functional blocks, the main units in a device according to the invention forming a temporal and spatial processing assembly.
Figure 10:
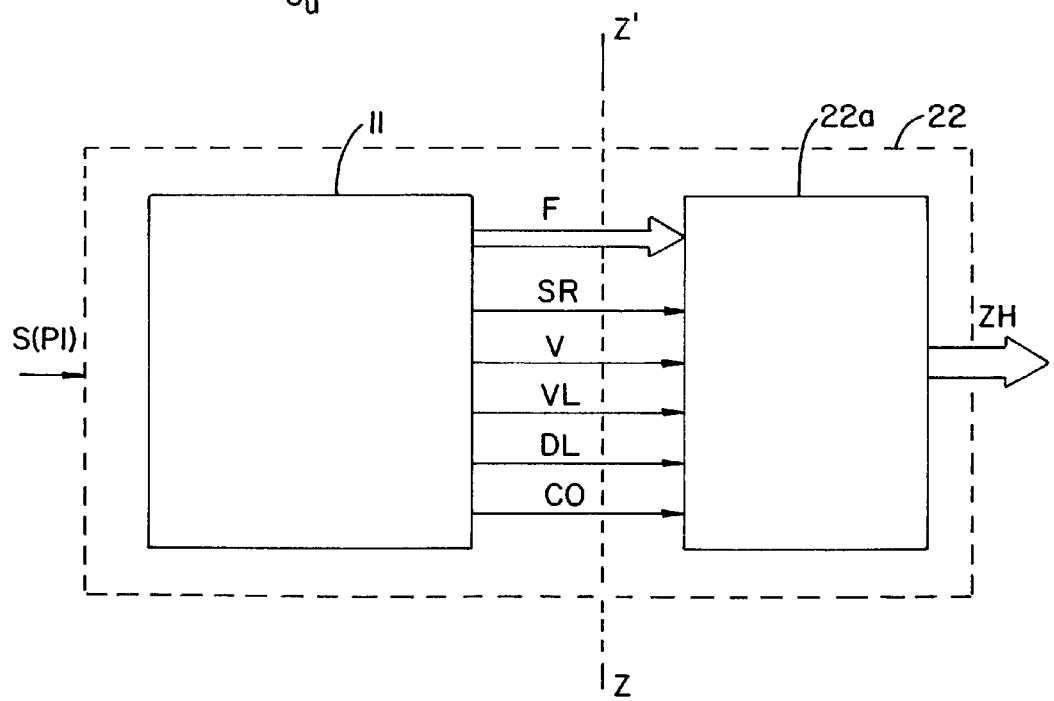

FIG. 10 shows diagrammatically the assembly of the device in FIG. 2, along line $Z-Z^1$, with an additional assembly, according to a preferred embodiment of the invention.

Figure 11:
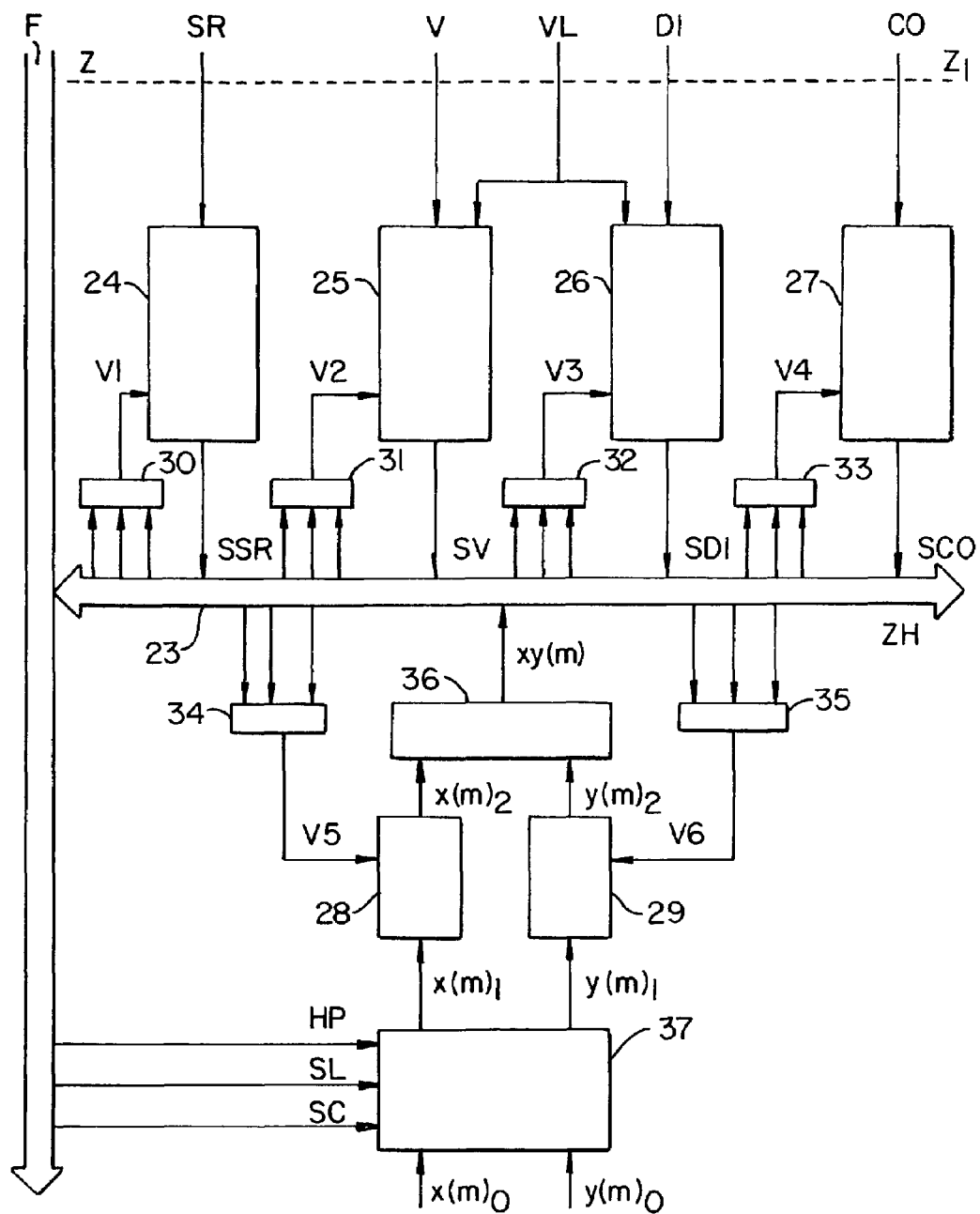

FIG. 11 shows said additional assembly in FIG. 10, in block form; FIG. 2 and FIG. 11 being assembled along line $Z-Z^1$ in dot and dashed lines shown on FIGS. 2 and 10.

Figure 12:
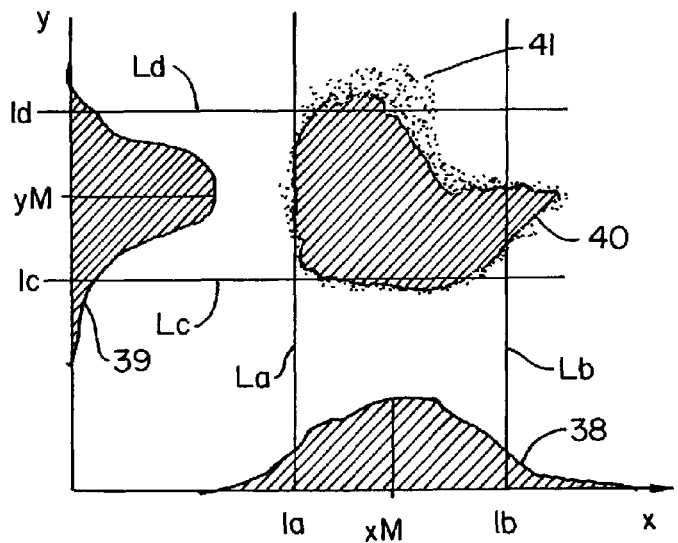

FIG. 12 shows the formation of two single dimensional histograms, and, starting from these histograms, a two-dimensional histogram of a moving area, for an input signal.

Figure 13:
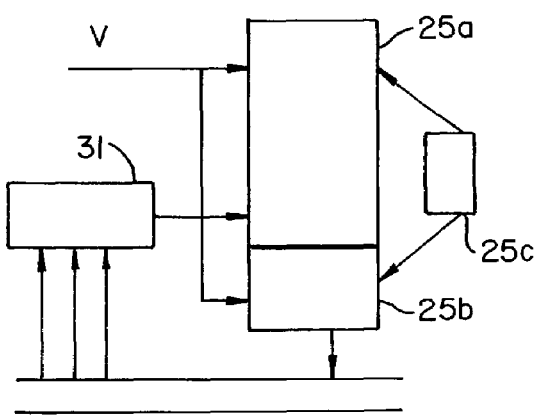

FIG. 13 shows more details of a histogram formation and processing block or unit, and its associated linear combination block.

Figure 14:
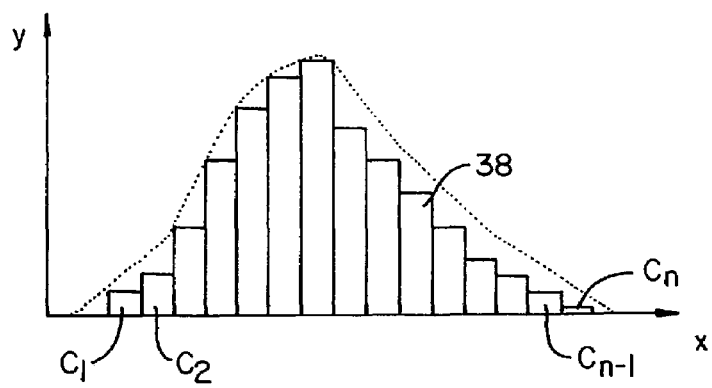

FIG. 14 illustrates a single dimensional histogram.

Figure 15:
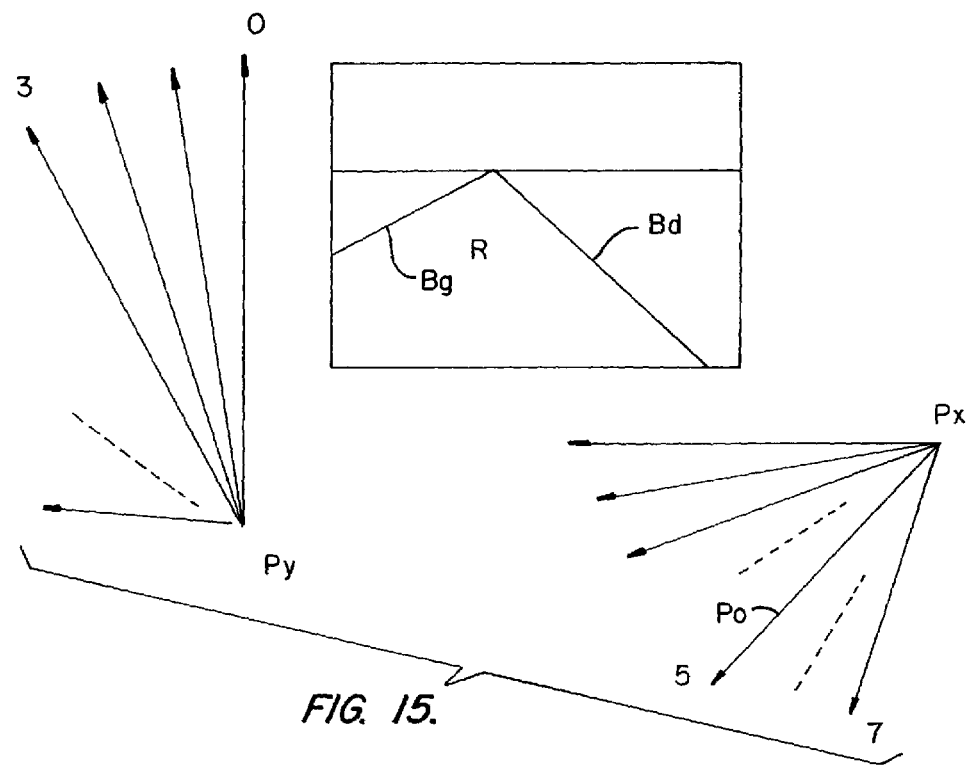
Figures 16A, 16B, 16C:
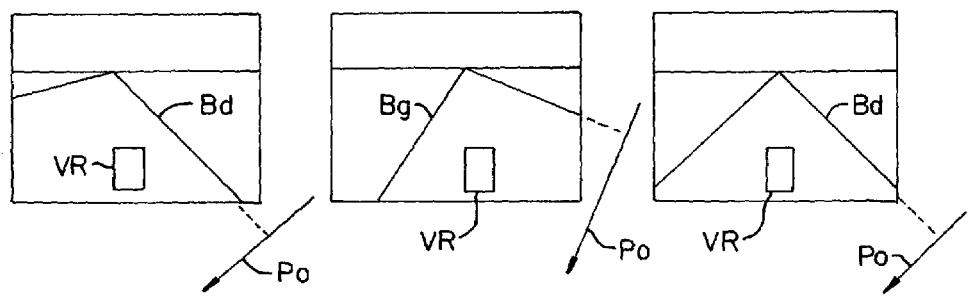

FIGS. 15 and 16 illustrate the use of a variation in the observation slope of a scene.

Figure 17:
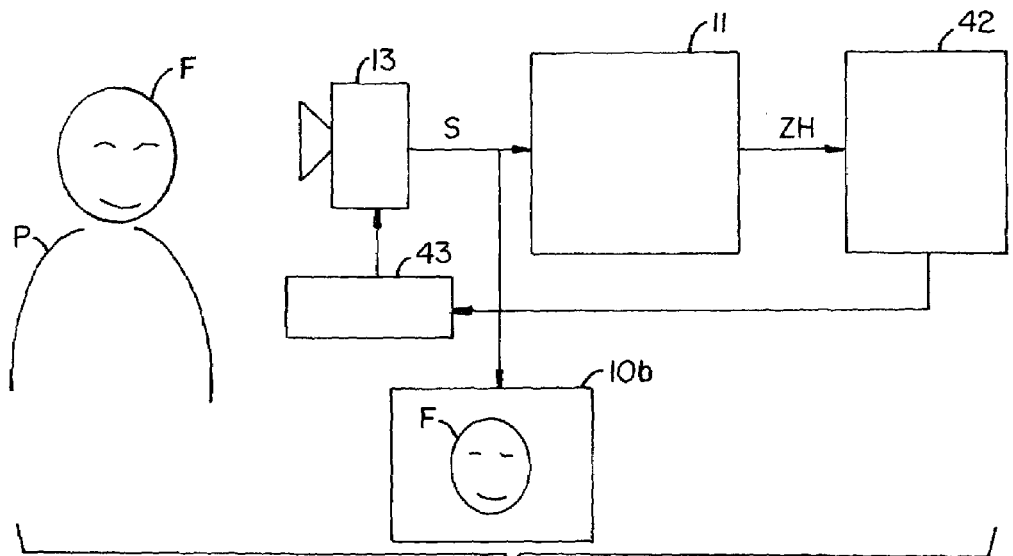
Figure 18:
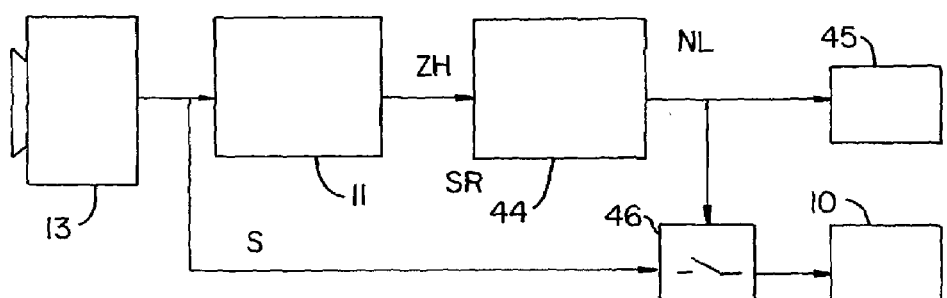
Figure 19:
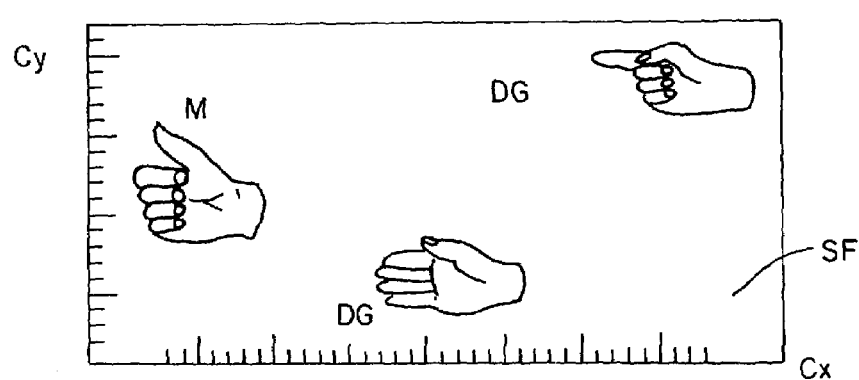

FIGS. 17, 18 and 19 illustrate other possible applications of the device according to the invention, in block form for FIGS. 17 and 18, FIG. 17 concerning video conference, FIG. 18 the monitoring of highways, motorways or main roads and FIG. 19 an operator controlling a machine by hand movements.

Figures 20, 21:
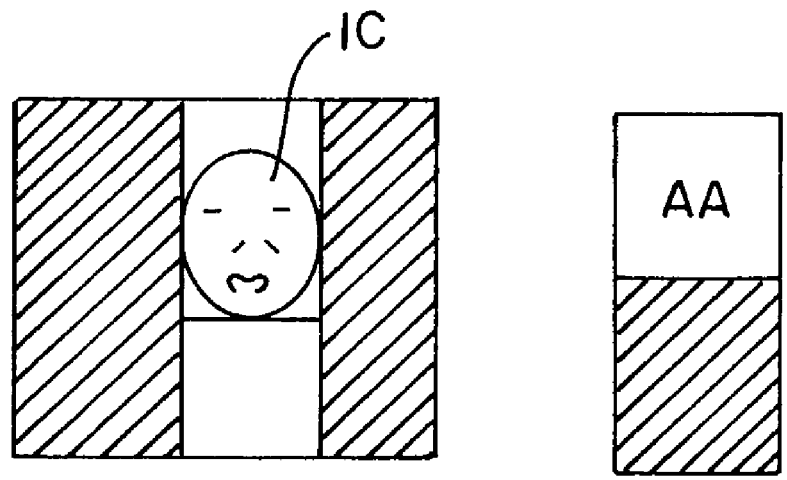

FIGS. 20 and 21 diagrammatically represent an application of the invention to the monitoring of a car driver falling asleep.

Figure 22:
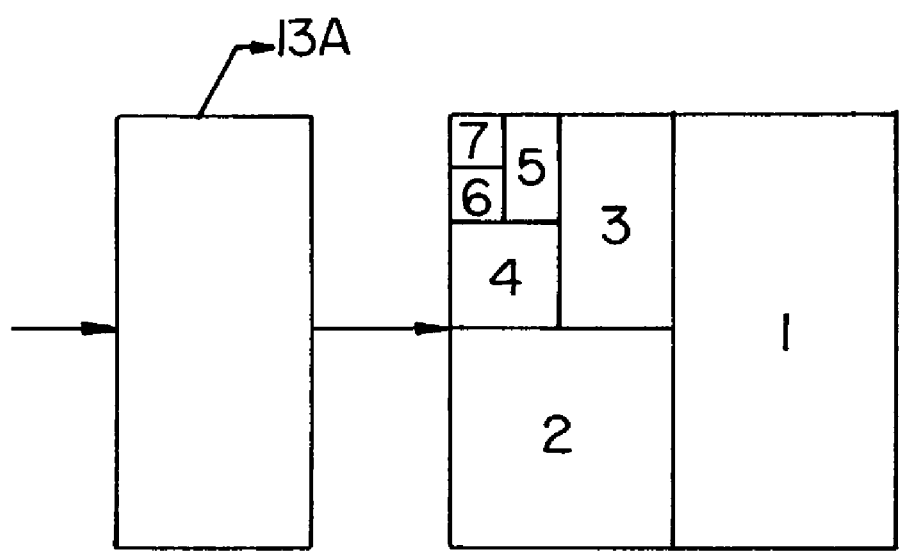

FIG. 22 shows the transformed image according to the Mallat diagram.

Figure 1:
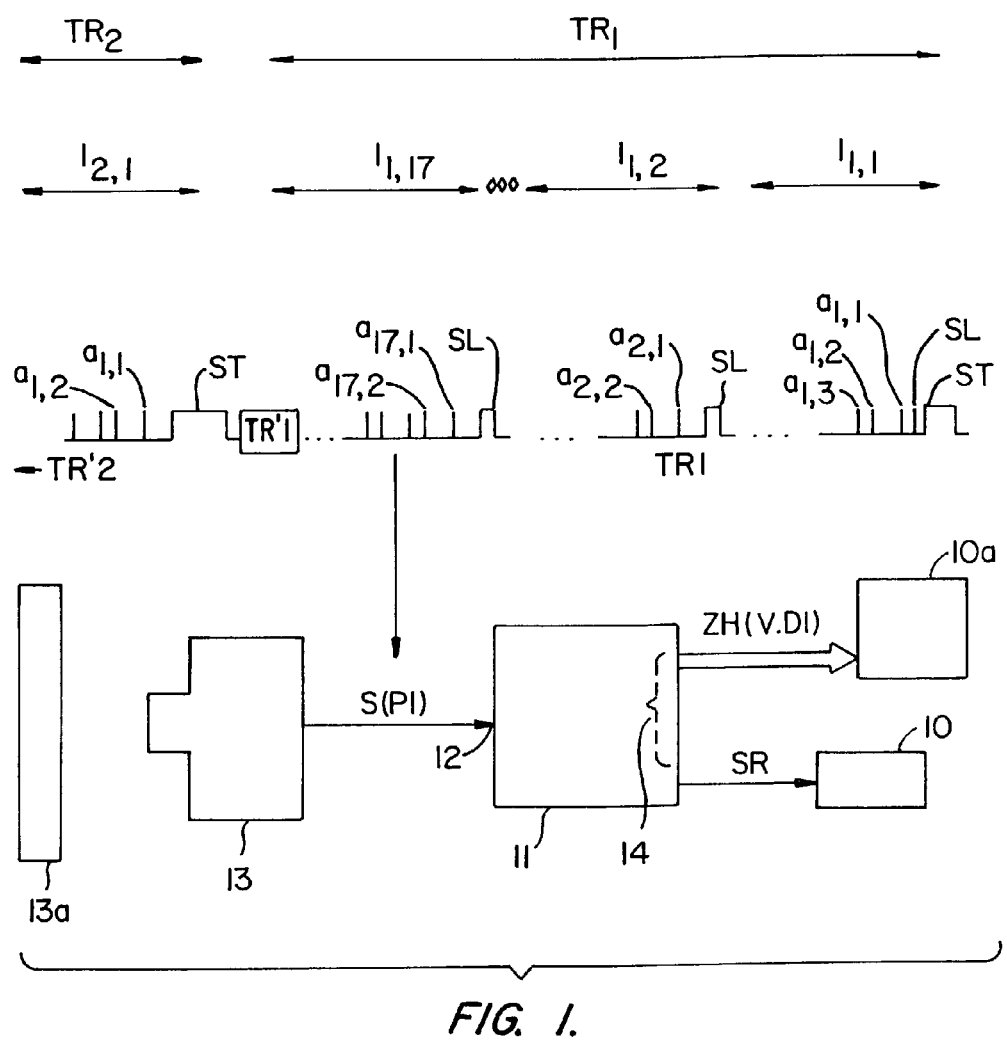
FIG. 1 illustrates very diagrammatically the entire system according to the invention with its inputs and outputs, and the input signal for this system.

Referring firstly to FIG. 1, it can be seen that, in the preferred embodiment, device 11 according to the invention comprises firstly an input 12 that receives a digital video signal S originating from a video camera or camescope 13, with one or several CMOS type CCD sensors, having a direct digital output, or an analog output converted by an analog/digital converter into a digital output. This signal S is composed, in a known manner, by a succession of pairs of interlaced frames, such as $TR_1$ and $TR'_1$ $TR_2$ and $TR'_2$, each consisting of a succession of horizontal scanned lines, each line (such as $l_{1.1}, l_{1.2}, \ldots, l_{1\ 17} \ldots$ in $TR_l$ and $l_{2.1}$ in $TR_2$) being constituted by a succession of elementary signals of pixels or image-points PI representative of points (such as $a_{1.1}, a_{1.2}$ and $a_{1.3}$ for line $l_{1.1}$; $a_{2.1}, a_{2.2}$ for line $l_{1.2}$; $a1_{17.1}$ and $a_{17.2}$ for line $l_{1.17}$; $a1_{1.1}$ and $a_{1.2}$ for line $l_{2.1}$) of scene 13a monitored by camera 13; this is why the drawing shows S(PI), representing a signal S composed of pixels PI.

In the known manner, S(PI) comprises frame synchronization (ST) signals at the beginning of each frame, and line synchronization (SL) signals at the beginning of each line.

Therefore, it can be seen that the S(PI) signal is composed of:

a succession of sequences (successive frames) within the framework of a time domain and in each sequence (in each frame) by a series of subsequences (lines, pixels) within the framework of a spatial domain.

In the time domain, the expression "successive frames" will be used to refer to successive frames of the same kind (i.e. odd frames such as $TR_1$, or even frames such as $TR'_1$) in pairs of frames such as $TR_1$–$TR'_1$, forming successive images of the digital video signal S(PI), and the expression "successive pixels in the same position" will denote successive values of the pixels (PI) in the same location in successive frames of the same kind, for example $a_{1.1}$ of $l_{1.1}$ in frame $TR_1$ and $a_{1.1}$ of $l_{2.1}$ in the next corresponding frame $TR_2$.

Furthermore, device 11 includes outputs 14 outputting a number of digital signals, produced by it, which are useful to signal the existence of an area or "object" (in the more general sense described above) with relative displacement and its localization, together with its speed and direction of displacement, if it is significant in an effectively stationary environment, in particular the complex signal ZH diagrammatically grouping signals signaling the existence and localization of this area or object, the speed V and the oriented direction of displacement DI, and possibly the input digital video signal S delayed to make it synchronous with the previous signals to take account of their calculation time, this delayed signal SR being used to display the image perceived by camera 13 on a monitor or television screen 10, at the time at which is available the information concerning the area in relative displacement (if any), namely the signal ZH, (V, DI), that can be used in a processing and checking assembly 10a.

We will now refer to FIG. 2 to describe the structure of the first part of the device 11 shown in FIG. 1, this first part being represented by dashed lines inside frame 11a on this FIG. 2.

The main components of assembly 11a are firstly a temporal processing unit 15, with an associated memory 16, and secondly a spatial processing unit 17, with an associated delay unit 18 and sequencing unit 19, and a pixel clock 20 setting the rhythm for the temporal processing unit 15 and the sequencing unit 19.

The temporal processing unit 15 which, among other functions, smooths the video signal:
uses the digital video signal S, originating from the video camera 13 and consisting of a succession of pixel values PI, and HP pulses, generated by clock 20 (starting from signal S) at the pixel rate in a frame (in particular 13.5 MHz), to generate a number of signals as described below with reference to FIG. 3, and exchanges the values of two of these signals with memory 16, namely the smoothed values L of the digital video signal and the values C of the smoothing time constant, the values L and C being followed by the letter O for values stored in memory 16 from unit 15, or the letter I for values originating from memory 16 and reaching unit 15, and
produces a binary output signal DP, identifying whether or not a limit has been exceeded, and a digital signal CO, indicating the updated calculated value of the time constant, namely the value CO sent to memory 16.

Figure 3:
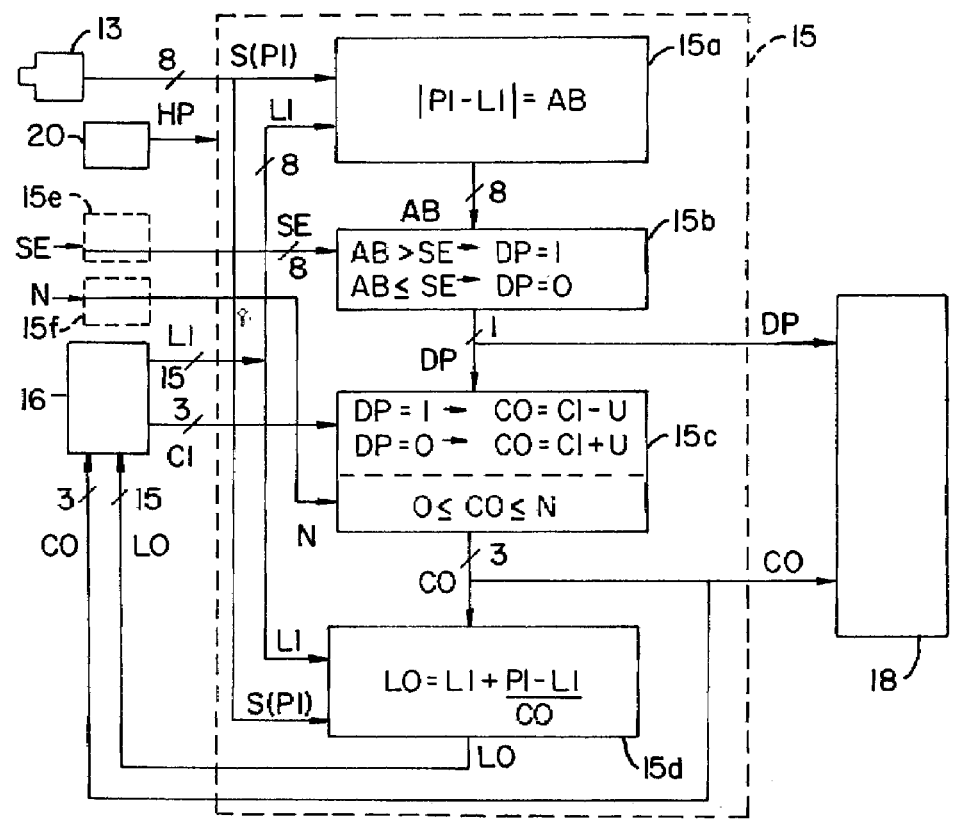
FIGS. 3 and 4 illustrate functional diagrams of the temporal calculation processing assembly and the spatial matrix distribution processing assembly respectively, forming part of the device of FIG. 2.

The computing and/or comparison blocks constituting the temporal processing unit 15 are shown in detail in FIG. 3; unit 15 comprises four blocks 15a, 15b, 15c, 15d.

The first block 15a of unit 15, using
the input digital video signal S, composed of a succession of pixel signals PI, and
a smoothed value LI of this signal S for the immediately preceding corresponding frame, calculated beforehand by unit 15 as LO and temporarily stored in memory 16 (as explained below)
calculates the absolute value AB of the difference between the input values of PI and LI for the same pixel position (for example $a_{1,1}$, of $l_{1,1}$ in $TR_1$ and of $l_{2,1}$ in $TR_2$)

$$AB = |PI - LI|$$

at the rate imposed by the HP clock signals of clock 20.

The second block 15b is a test block:
this block receives the above mentioned digital signal AB from unit 15a and a digital signal of the threshold value SE, which could be constant, but which usually depends on the pixel value; it is then made to vary in the same sense as said value so that it forms a gamma correction (known means of varying SE to make a gamma correction being represented by the optional block 15e shown in dashed lines); and it compares these two digital signals representative of AB and SE in order to determine a binary signal DP, in other words a signal that may be equal to one of two values 1 and 0 to signal respectively that AB does or does not exceed said threshold SE:

if AB is greater than SE, DP will be assigned the value 1 in unit 15b to show that the threshold has been exceeded;

if AB is less than or equal to SE, DP will be assigned the value 0 in unit 15b to show that the threshold has not been exceeded.

In fact when DP=1, the difference between PI and LI, in other words between the input digital video signal and the previous smoothed digital video signal, is too great, and this difference has to be reduced by reducing the smoothing time constant, and conversely if DP=0 this time constant has to be increased.

The third block 15c makes the required variation to the value of the time constant as a function of the value of DP:
DP=1, block 15c reduces the time constant by a unit value U: CO (new value of this constant)=CI (old value of the constant)−U;
if DP=0, block 15c increases the time constant by the same unit value U: CO=CI+U.

Consequently, block 15c receives the binary excess signal DP, mentioned above, from block 15b, on one input, and the CI signal, which is the value of the previous time constant stored in memory 16, on another input, and reduces or increases, by the unit value U, the input time constant CI which becomes CO sent to said memory 16 to replace CI.

Advantageously, the time constant, on which convergence of smoothing depends (as a function of the time necessary for the smoothed value to reach the input value of the digital video signal), is represented by a power of 2, namely by a value $2^p$, and this integer number p is the number that will be reduced or increased by one unit, in other words by 1, in block 15c; in this case U=1 for p on FIG. 3, if DP=1, block 15c subtracts a unit (1) from factor p in the time constant $2^p$ which becomes $2^{p-1}$;

if DP=0, block 15c adds a unit (1) to the factor p in the time constant $2^p$, which becomes $2^{p+1}$.

The choice of a time constant of the type $2^p$ has two advantages, firstly it corresponds to the physiology of human sight and secondly it facilitates calculations and thus simplifies the structure of block 15c.

Block 15c must also comply with two conditions, namely CO must remain between two limiting values: CO must not become negative (CO≧0) and it must not exceed a limit N (CO≦N). In the special case in which CI and CO are in the form $2^p$, the upper limit N is represented by an integer number n which is a maximum value for p.

The upper limit N (or n) may either be constant or variable; if it is variable, an optional unit 15f (in dashed lines) makes this variation of N (or n), for example following an order by the user. The consequence of increasing N is to increase the displacement detection sensitivity, whereas reducing N improves detection of high speeds.

Finally, the fourth block 15d receives, on a first input, the value CO of the new time constant generated in block 15c, and on a second input, the incoming digital video signal S in the form of pixel value information PI, and, on a third input, the smoothed value of the previous entering digital video signal, namely LI, from memory 16, and it calculates:

$$LO = LI + (PI - LI)/CO$$

which is delivered on its output.

In fact, the term (PI−LI)/CO represents the modification made to the smoothed value of the digital video signal, taking account of the modified value CO of the time constant and it is proportional to the algebraic difference between the effective value of the current entering pixel PI from camera 13 and its previous smoothing value LI and inversely proportional to CO.

If CO=$2^p$, then $$LO=LI+(PI-LI)/2^{p0}$$

using $p_0$, the value of p calculated in unit 15c and which replaces previous value pi of p in memory 16.

Consequently, the temporal processing unit 15 with four calculation blocks 15a, 15b, 15c, 15d:

receives S(PI) from video camera 13, HP clock pulses for controlling the rate of operations, and SE and N (or n) threshold signals;

starting from the LI and CI incoming signals from the associated memory 16, determines updated signals LO and CO that are sent into said memory to replace LI and CI respectively and which represent the new calculated values of the smoothed digital video signal and the time constant, respectively; and delivers the CO signal mentioned above and the binary threshold exceeding signal DP that it, calculated from PI, LI and SE, to the spatial processing unit 17 through the delay unit 18.

The purpose of the smoothing operation is to normalize variations of the digital value of the entering video signal for each pixel or image point, namely the variation of each PI, by reducing the variation differences and replacing, for each pixel, the successive real variable values of PI at this image point by the smoothed LO values, which are less variable than the PI values.

Figure 4:
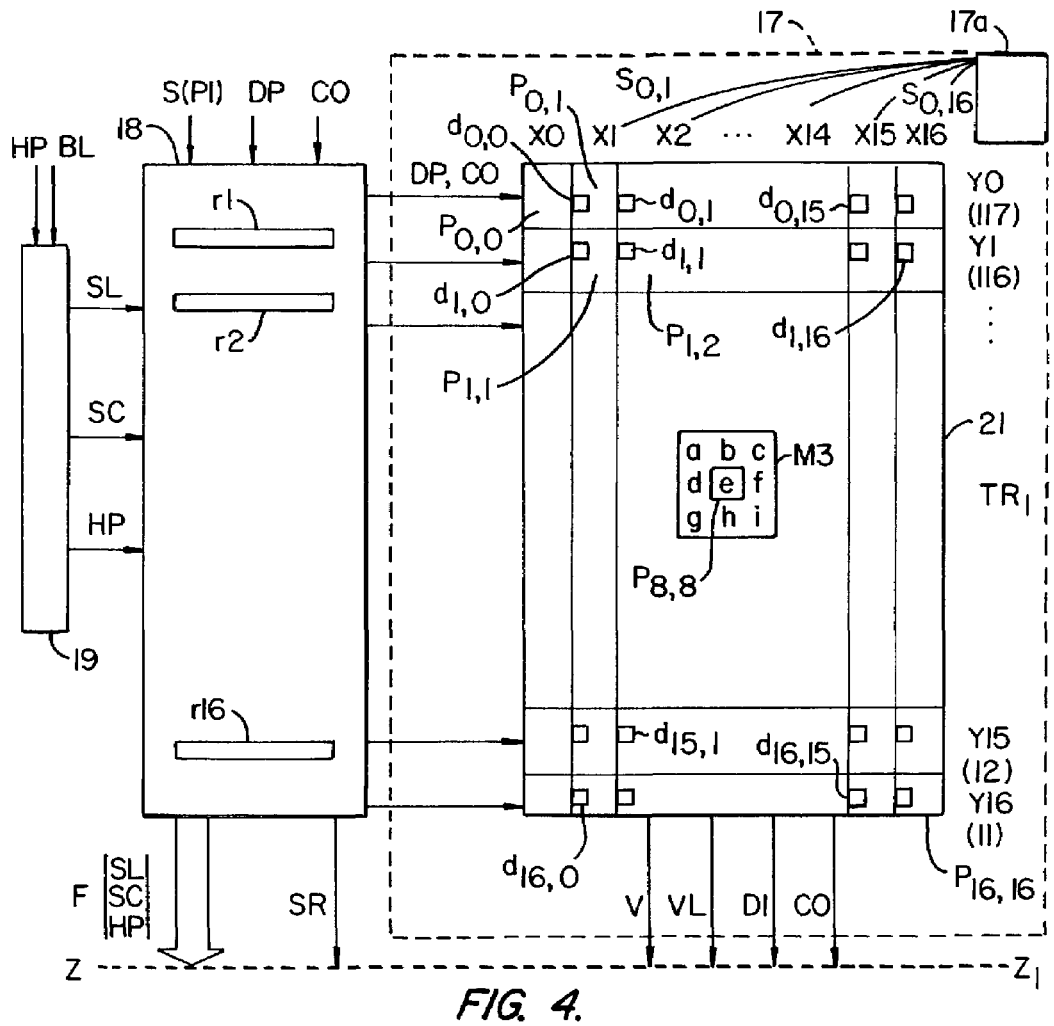

Thus for each incoming PI, the temporal processing unit 15, in combination with memory 16, substitutes a smoothed value LO with reduced variations, by using a binary threshold exceeding or not exceeding signal DP and a time constant signal CO that are updated and transferred to the spatial processing unit illustrated in FIG. 4.

Each pixel inside the area of a frame can be identified by two coordinates (usually orthogonal), along an abscissa and an ordinate, namely x and y, by assigning two indices to the pixel, namely i (line number) for the y coordinate and j (pixel number in the line) for the x coordinate. Each pixel with indices i and j has a video value (value of the amplitude of the video signal) $PI_{ij}$.

If we now consider the variation with time t of values of $PI_{ij}$ for successive corresponding successive frames at times $t_0$, $t_1$, $t_2$, $t_3$, . . . , separated by a period T corresponding to the image period (usually equal to two frame periods) and which may be 0.04 s if the frequency of the video image signal is 25 Hz, or 0.0333 s if the frequency of the video image signal is 33 Hz, or 50 Hz for sensors with progressive image (1 frame/1 image), the signal of a video pixel with localization indices i and j has successive values denoted $PI_{ijt0}$, $PT_{ijt1}$, $PI_{ijt2}$, $PI_{ijt3}$, . . . at these instants $t_0$, $t_1$, $t_2$, $t_3$.

Within the scope of the invention, for $PI_{ijt}$ successive smoothing values $LO_{ijt}$, namely $LO_{ijt0}$, $LO_{ijt1}$, $LO_{ijt2}$, $LO_{ijt3}$, are substituted in the temporal processing unit 15.

For each of the successive pixels or image points with coordinates i, j, at time t, in other words $P_{ijt}$, its real value $PI_{ijt}$ is replaced by a smoothed value given by the formula $$LO_{ijt}=LI_{ijt(t-1)}+(PI_{ijt}-LI_{ij(t-1)})/CO_{ijt}$$

The time constant is preferably of the form $2^{pijt}$.

Calculations carried out in unit 15, and particularly in block 15d for each time interval T separating $t_1$ from $t_0$, $t_2$ from $t_1$, $t_3$ from $t_2$, etc. make the value $LO_{ijt}$ converge towards the value $PI_{ijt}$, at a speed that depends on the time constant which is variable in space (and therefore depends on i and j) and in time (and therefore depends on t) and which may be written $CO_{ijt}$.

In all cases, the convergence of $LO_{ijt}$ is slower when $CO_{ijt}$ is larger. There is no longer any smoothing if $CO_{ijt}=1$.

Obviously, in the above formulas it would be possible to substitute the Cartesian coordinates y and x for the indices i and j giving the line order number and the pixel number in the line.

Block 15a calculates AB=|PI−LI|, the indices i, j and t being not explicit, the magnitude AB representing the instantaneous variability of the digital video signal S(PI) with respect to the smoothed signal LI, for each triplet i, j, t.

One of the characteristics of a device according to the invention is to perform, in the temporal processing unit 15, a smoothing of the pixel values, to determine, for each pixel, the successive values of a smoothing time constant and a binary signal identifying whether or not a threshold has been exceeded or not by the absolute value of the difference between the value of the pixel and the smoothed value of this pixel for two successive corresponding frames, to distribute in a plane matrix the numerical values at a same instant, both of said time constant and of said binary signal for the pixels in a limited portion of the frame, this portion scanning the frame in order to localize, based on local variations of these two values at this instant, an area in relative movement and to determine the speed and (oriented) direction of the effective displacement as a function of this distribution, this being done by a spatial processing assembly described below with reference to FIG. 4.

The convergence of smoothing is done by calculation blocks 15b and 15c which determine a variation of the value of the new incoming time constant CO (actually $CO_{ijt}$) so as to accelerate the convergence. This is done by comparing AB (actually $AB_{ijt}$) with the threshold value SE, that may have a constant value, or is preferably variable, and if it is variable it may be a function of the pixel value in order to make a gamma correction: if the pixel value increases, the limit increases, and vice versa. The result of the comparison of AB with the threshold value SE (actually $SE_{ijt}$ if said value varies as a function of the pixel value, this variation being done in an optional calculation block 15e) generates, in block 15b, the binary displacement signal DP with two possible values 1 and 0 as described above.

The binary signal DP arrives in block 15c to vary the value of the time constant. Consequently, the calculation unit 15c also receives the value of the incoming time constant CI from memory 16 and updates it using the new value of the time constant CO which (among others) is sent to memory 16, where it replaces the former value CI; in fact for values of CI and CO, are used: $CI_{ij}$ and $CO_{ij}$ at two successive instants, for example $t_0$ and $t_1$, separated by the interval T between two successive corresponding frames (either odd, or even).

Block 15c that receives DP and CI adds or subtracts a unit value (U) to the value of the time constant CI or one unit to p when CO is in the form $2^p$, depending on whether the binary signal DP defines that a threshold value is exceeded (DP=1) or not exceeded (DP=0).

If the threshold is exceeded, the value of this constant is too high and it is reduced, and vice versa.

Block 15c also ensures that the new value of the time constant CO, deduced from CI by adding or subtracting a unit, remains between 0 (CO not negative) and a threshold value N (CO not greater than N). If these two conditions are not satisfied, block 15c does not modify the value of CI (which was actually inside the interval from 0 to N, both limits being included) and then CO=CI.

The upper limiting value N (or n) may be constant or variable; if it is variable, it must not exceed a limiting value N max. (or n max.); the variation, if any, being imposed by block 15f under the effect of a control available to the user.

As a variant, N or n may be made to depend on PI (where N, n and PI are actually assigned the three indices i, j, t) in order to ensure regulation of the variation of LO (which is calculated in block 15d) as a function of the level of PI, which may be expressed "$N_{ijt}$ or $n_{ijt}$ is a function of $PI_{ijt}$", the determination of $N_{ijt}$ or $n_{ijt}=f(PI_{ijt})$ being done in a calculation block substituted for the illustrated block 15f and to which the value of PI is delivered by video camera 13, in addition to N.

Advantageously, the time constant C (actually each $C_{ijt}$) may be forced to satisfy the condition of having a numerical value which is either a multiple of 2, and more particularly a power of 2 regardless of the values of i, j and t; in this particular case $C_{ijt}=2^{p(ijt)}$, where p is a small integer number that is a function of i, j and t and can be represented by a small number of bits. This condition provides the additional advantages mentioned above:

the smoothing convergence law is similar to the physiology laws of human sight;

the electronic construction of blocks 15c and 15d is simplified; in particular, in block 15d, which is designed to determine the variation in the value of the time constant, for each i, j pair, by the following formula $$LO=LI+(PI-LI)/CO$$

the calculations are simplified if CO is in the form $2^p$ (where p is a small integer number), the value of the threshold value n of p itself being a small integer number represented by a limited number of bits.

In all cases, the new smoothing value LO of the incoming digital video signal S is sent into memory 16, where it replaces LI (for each pair of indices ij).

On inspecting FIGS. 2 and 3, it can be observed that the temporal processing unit 15, which comprises calculation blocks 15a, 15b, 15c and 15d, and possibly block 15e and/or block 15f, and which cooperates with memory 16, determines and delivers as outputs, as explained above, the following values, for each i, j, t triplet.

firstly, the updated smoothed value LO which is transferred into memory 16 to replace the previous smoothed value LI;

secondly, two digital signals, namely:

a binary signal DP which indicates that a given threshold has either been exceeded (DP=1) or not exceeded (DP=0) by the variation in the absolute value of the incoming pixel signal originating from the video camera compared with the previous smoothed pixel signal for the same point; and an amplitude digital signal composed of the value of the updated time constant CO;

these digital signals DP and CO are received, through the delay unit 18, by the spatial processing unit 17 which will be described later, the signal CO also being entered into memory 16, where the value CO replaces the previous value CI for the same pixel.

Therefore, it can be seen that the capacity of memory 16 for storing firstly successive values of the smoothed pixel signal and secondly the time constant, assuming that there are R pixels in a frame, and therefore 2R pixels per complete image, must be at least 2R(e+f) bits, where e and f are the numbers of bits assigned to a pixel signal, and to a time constant respectively. In fact, the memory capacity does not need to be much bigger; it simply needs to exceed 2R(e+f) bits by the number of bits necessary for its correct operation, particularly for addressing and extracting bits from smoothed pixel signals and time constant bits as a function of indices i and j. If each video image is composed of a single frame, it is sufficient to use R(e+f) bits instead of 2R(e+f) bits.

The outgoing signals $DP_{ij}$ and $CO_{ij}$, at instant t, from the temporal processing assembly 15 are analyzed and used in a spatial processing assembly illustrated in FIG. 4, the assembly of FIGS. 3 and 4 being illustrated in FIG. 2.

In fact, the temporal processing assembly 15 processes frame signals, whereas the spatial processing assembly 17 in FIG. 4 processes sub-sequences of lines and pixels in a frame.

Figure 5:
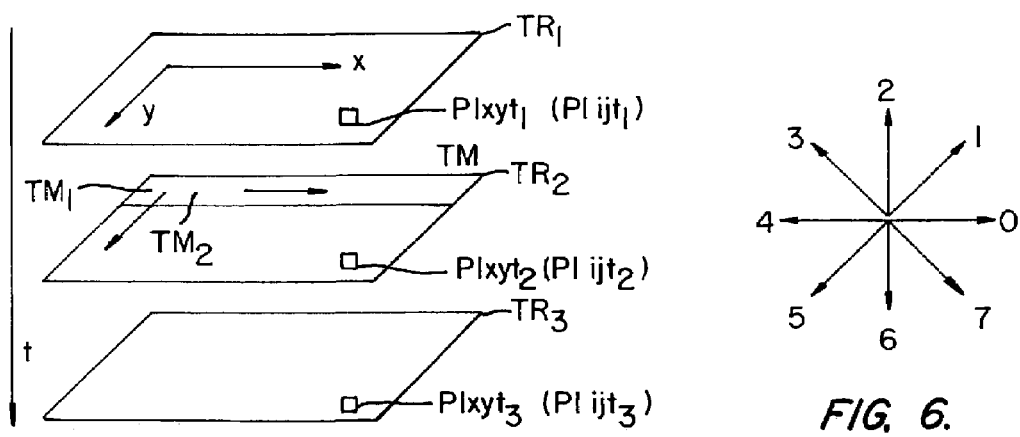
FIG. 5 shows diagrammatically temporal processing and spatial processing in a system according to the invention.

FIG. 5 diagrammatically shows the temporal processing of the successive corresponding frame sequences $TR_1$, $TR_2$, $TR_3$ superimposed on the figure and the spatial processing in the first of these frames, in other words $TR_1$, illustrating the Cartesian coordinates x and y and a pixel PI with coordinates y,x, in other words indices i,j at time $t_1$; the successive pixels with the same indices ij in the three frames $TR_1$, $TR_2$, $TR_3$ are indexed $ijt_1$, $ijt_2$ and $ijt_3$ respectively, and they have pixel values of $PIijt_1$, $PIijt_2$ and $PIijt_3$ respectively. A plane in FIG. 5 corresponds to the spatial processing of a frame, whereas the superposition of frames corresponds to the temporal processing (where time t is the variable).

The spatial processing unit 17, to which a delay unit 18 is associated (which is also shown in FIG. 4) cooperates with a control unit 19 that is controlled by a clock 20 that delivers a clock pulse HP at each successive pixel signal (FIG. 2 for the assembly).

Outgoing signals $DP_{ij}$ and $CO_{ij}$ from temporal processing unit 15 are distributed by unit 17 into a matrix 21 of reduced size containing a number of rows and columns much smaller than the number of lines L and number of pixels M per line, respectively, in $DP_{ij}$ and $CO_{ij}$ at a given instant t. In particular, the matrix may include 2l+1 lines along the y axis and 2m+1 columns along the x axis (in Cartesian coordinates), where l and m are small integer numbers. Advantageously, l and m are chosen to be powers of 2, where for example l is equal to $2^a$ and m is equal to $2^b$, a and b being integer numbers of about 2 to 5 for example. To simplify the drawing and the explanation, m will be taken to be l as an example (although it can be different) and $m=l=2^3=8$; in this case, the matrix 21 will have 2×8+1=17 rows and 17 columns.

FIG. 4 shows part of the 17 rows $Y_0$, $Y_1$, ... $Y_{15}$ $Y_{16}$ and part of the 17 columns $X_0$, $X_1$, ... $X_{15}$ $X_{16}$ forming the matrix 21 of unit 17.

The objective is to distribute into matrix 21 with l+1 rows, in particular 17 rows, and m+1 columns, in particular 17 columns, the incoming flows of $DP_{ijt}$ and $CO_{ijt}$, in other words the binary threshold exceeding signals DP and the digital amplitude signals representing the time constant CO that arriving from the temporal processing unit 15, arranged in a wider matrix distribution for a frame consisting of L (in particular 312.5) lines, and M pixels per row, in particular of the order of 250 to 800 depending on the TV standard used.

In order to distinguish the two matrices, i.e. the L×M video signal matrix and the l×m matrix of unit 17, referenced 21, the indices i and j will be used for the two coordinates of the former matrix (which will only be seen when the digital video signal is displayed on a television screen or monitor) and the indices x and y for the two coordinates of the latter (shown in FIG. 4) at a given instant, a pixel with an instantaneous value $PI_{ijt}$ is characterized, at the input of the spatial processing unit 17, by two digital signals $DP_{ijt}$ and $CO_{ijt}$. The L×M matrix of these two signals moves by scanning through the much smaller (2l+1)×(2m+1) matrix 21 as explained with reference to FIG. 4, matrix 21 materializing (2l+1)×(2m+1) pixels corresponding to the same frame.

In this matrix 21, each pixel is defined by a row order number between 0 and 16 (inclusive), for rows $Y_0$ to $Y_{16}$ respectively, and a column order number between 0 and 16 (inclusive), for columns $X_0$ to $X_{16}$ respectively, in the case in which l=m=8, namely 2l+1=2m+1=17. In this case, matrix 21 will constitute a representation in the plane of 17×17=289 pixels, whereas the matrix of the video signal will include several tens or hundreds of thousands of pixels, or even more.

In FIG. 4, elongated horizontal rectangles $Y_0$ to $Y_{16}$ (only four of which have been represented, named $Y_0, Y_1, Y_{15}$ and $Y_{16}$) and vertical lines $X_0$ to $X_{16}$ (of which only four have been represented namely $X_0, X_1, X_{15}$, and $X_{16}$) have been used to illustrate this matrix 21 (of unit 17) with 17×17 image points or pixels having indices defined at the intersection of an ordinate row and an abscissa column. For example, the pixel position $P_{88}$ is at the intersection of column 8 and row 8 as illustrated in the figure at e, which is the center of matrix 21.

In order to carry out the successive spatial distribution of portions of this L×M matrix within the (2l+1) (2m+1) matrix 21, the unit 17 is associated with a delay unit 18 which receives firstly the DP and CO signals (with assigned indices ijt) and secondly the incoming pixel signal S, in other words PI (also with assigned indices ijt), and also an HP signal from a clock 20 and line sequence signals SL and column sequence signals SC (FIGS. 2 and 4).

As shown in FIG. 1, the S(PI) signal includes not only pixel value signals, such as $a_{1.1}, a_{1.2}$, making up a time sequence (successive frames) and spatial sub-sequences (pixels per line in each frame), but also synchronization signals ST, SL, starting from which the clock unit 20 deduces a clock signal for example at a frequency of 13.5 MHz, namely one mark pulse for each pixel in a video frame, and also blanking signals BL that make unit 19 non-operational during the above mentioned synchronization signals.

In response to these HP and BL signals from clock 20 (FIG. 2), the rate control unit 19 delivers a line sequence signal SL at a frequency equal to the quotient of 13.5 MHz by the number of columns per frame (for example 400) to the delay unit 18, together with a frame signal SC, the frequency of which is equal to the above mentioned quotient 13.5/400 MHz divided by the number of rows in the video image, for example 312.5, and HP.

Unit 18 uses these SL and SC signals and the HP clock signal to control the row by row spatial distribution in matrix 21.

Consequently, the successive rows $Y_0$ to $Y_{16}$ receive the DP and CO signals
not delayed (row $Y_0$);
delayed by one TP period, equal to the duration of a frame line (row $Y_1$);
delayed by 2 TP (row $Y_2$); and so on until
delayed by 16 TP (row $Y_{16}$).

The successive delays having the duration of a frame row, namely TP, are carried out in a cascade of sixteen delay circuits $r_1, r_2 \ldots r_{16}$ that serve rows $Y_1, Y_2 \ldots Y_{16}$ respectively, row $Y_0$ being served directly by the DP and CO signals without any delay arriving from unit 15.

All circuits $r_1, r_2, \ldots r_{16}$ may be built up by a delay line with sixteen outputs, the delay imposed by any section thereof between two successive outputs being constant and equal to TP.

The rate control unit 19 controls the scanning of the entire L×M frame matrix over the (2l+1) (2m+1) matrix 21, in rotation for successive rows of successive frames making use of the row sequence signals SL, using the following procedure.

The circular displacement of pixels in a row of the frame matrix on the 17×17 matrix, for example from $X_0$ to $X_{16}$ on row $Y_0$, is done by a cascade of sixteen shift registers d on each of the 17 rows from $Y_0$ to $Y_{16}$ (giving a total of 16×17=272 shift registers) placed in each row between two successive pixel positions, namely the register $d_{01}$ between positions $PI_{00}$ and $PI_{01}$, register $d_{02}$ between positions $PI_{01}$ and $PI_{02}$, etc. Each register imposes a delay TS equal to the time difference between two successive pixels in a row or line, using the column sequence signals SC.

Note that, due to the fact that rows $l_1, l_2 \ldots l_{17}$ in a frame $TR_1$ (FIG. 1), for S(PI) and for DP and CO, reach unit 18 shifted by TP (complete duration of a row) one after the other and that unit 18 distributes them with gradually increasing delays of TP onto rows $Y_0, Y_1 \ldots Y_{17}$ these rows display the DP and CO signals at a given time for rows $l_1, l_2, \ldots l_{17}$ in the same frame portion.

Similarly in a given row such as $l_1$, successive pixel signals $a_{1.1}, a_{1.2} \ldots$ arrive shifted by TS and the shift registers d impose a delay also equal to TS;

therefore, the result is that the DP and CO signals for pixels in a given row $Y_0$ to $Y_{16}$ in matrix 21, pixels available on this row, are contemporary, in other words they correspond to the same frame portion.

Therefore, both for the lines and for the pixels in these lines within a portion of the frame, the objective is to carry out a purely spatial processing since matrix 21 contains in its 17×17 pixel positions, the values of DP and CO for the 17 pixels in each of the 17 rows in the matrix of the same digital video signal S (PI), although these pixels such as $a_{1.1}$ arrive successively line by line and pixel by pixel in each of the successive rows (FIG. 1) in unit 18, with the corresponding DP and CO signals that are displayed.

The signals representing the contemporary COs and DPs of matrix 21 are available at a given instant on the 16×17=272 outputs of the shift registers, as well as upstream of the 17 registers ahead of the 17 rows, i.e. registers $d_{0.1}, d_{1.1} \ldots d_{16.1}$, which makes a total of 16×17+17=17×17 outputs for the 17×17 positions $P_{0\,0}, P_{0\,1}, \ldots P_{8\,8} \ldots P_{16.16}$.

Inside matrix 21, around the center e thereof having coordinates x=8, y=8 (which is why the number of rows and the number of columns in matrix 21 is preferably odd, 2l+1 and 2m+1 respectively), we may consider in particular a small matrix containing 3 rows and 3 columns where the central element of the 9 elements thereof is effectively the pixel e with coordinates x=8, y=8. Let this small matrix M3 be:

$$\begin{array}{ccc} a & b & c \\ d & \underline{e} & f \\ g & h & i \end{array} \quad (M3)$$

in which the central element $\underline{e}$ has been underlined.

To this 3×3 element matrix, containing 8 positions a, b, c, d, f, g, h, i around the central element or position $\underline{e}$, correspond eight oriented directions, each starting from the central position e up to one of the other eight positions.

Figure 6:
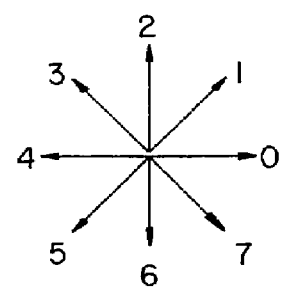
FIG. 6 illustrates the numerical values, according to the Freeman code, of the discrete directions starting from an origin center in the matrix of FIG. 4.

For this purpose, the eight directions may be identified using the Freeman code illustrated in FIG. 6, the directions being coded 0 to 7 starting from the x axis, in steps of 45°. In the Freeman code, the eight possible oriented directions, numbered 0 to 7, can be represented by a 3-bit number since $2^3=8$, giving eight possibilities.

Considering the small matrix M3 mentioned above, the 8 directions, according to the Freeman code, starting from the central position $\underline{e}$ are-as follows:

$$\begin{array}{ccc} 3 & 2 & 1 \\ 4 & \underline{e} & 0 \\ 5 & 6 & 7 \end{array}$$

as shown on FIG. 6.

Returning to matrix 21 in FIG. 4 with 17×17 image points or pixels, we will now describe how to identify an area in relative movement with respect to an approximately motionless environment in the scene observed by video camera 13 and therefore represented in the video digital signal S composed of pixels $PI_{ij}$, and how to determine the speed and oriented direction of an effective displacement with respect to an approximately motionless environment.

Between two successive frames, such as $TR_1$ and $TR_2$ (FIG. 5), the $PI_{ij}$ pixels in the signal S will be characterized, concerning their variation between instant $t_1$ (first frame) and instant $t_2$ (second frame), by the two signals $DP_{ij}$ and $CO_{ij}$ (distributed by scanning in matrix 21.

There is a significant variation of the pixel value at a point in this matrix if DP=1 for this point. Therefore, an area effectively moving is identified by the matrix area within which DP=1 at each point.

In fact a calculation unit 17a is used for examining at the same time the various nested square matrices centered on $\underline{e}$, with dimensions 15×15, 13×13, 11×11, 9×9, 7×7, 5×5 and 3×3, within the 17×17 position matrix 21, the 3×3 matrix being the M3 matrix mentioned above. The device determines which of these matrices is the smallest in which DPs=1 and are aligned along a straight line which determines the direction of movement of the area in which DPs=1 and which determines a variation of +1 and −1 around CO. For a variation of +1 and −1 around CO, DP must be equal to 1 at each value if the test is to be satisfied. The smallest matrix participating in the test is chosen (principal line).

Figure 7:
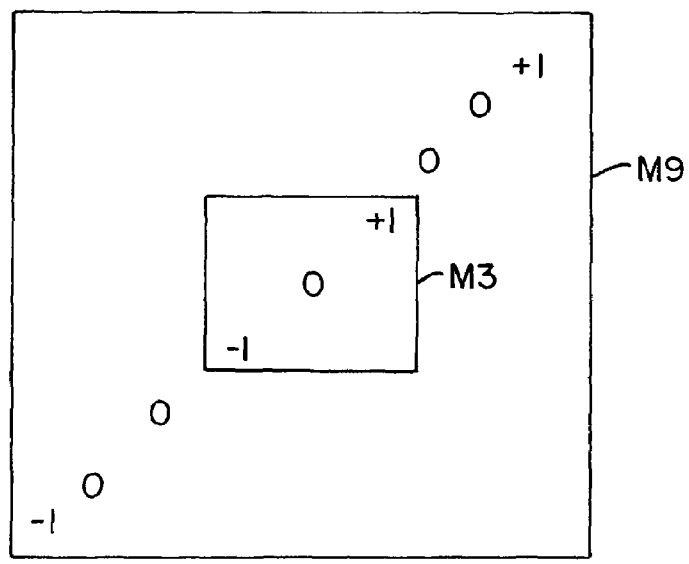
FIG. 7 illustrates two small nested matrices inside the temporal distribution matrix.

Then, within this moving area in one of the nested matrices, for example in the small matrix M3 with 3×3 elements, the device determines if CO varies on each side of the central position in a given direction, from +1 in an oriented direction and −1 along in the opposite oriented direction. For example, if we have −1, 0, +1 in the (oriented) direction 1, in other words in positions g, e, c respectively in the small matrix M3, then the displacement exists in this matrix from right to left in the (oriented) direction 1 in the Freeman code (FIG. 6). Obviously, at the same time in this direction in the small matrix: DP=1. The displacement speed is higher when the matrix, among the 3×3 to 15×15 nested matrices, in which CO varies from +1 or −1 between two adjacent positions along a direction is larger. For example, if we have −1, 0, +1 in oriented direction 1, in other words g, e, c in the 9×9 matrix denoted $M_9$, the displacement will be faster than if we have −1, 0, +1 in the 3×3 matrix denoted $M_3$ (FIG. 7).

Since CO is a power of 2 and is represented by this power in the preferred embodiments, an extended range of speeds can be identified by using only a few bits for the power of 2, while identifying a relatively low speed (that can be chosen by increasing the variation or margin for the test, for example −2, 0, +2 in positions g, e, c in the 3×3 matrix M3 would indicate a speed half as fast as the speed corresponding to −1, 0, +1 for the same positions in matrix M3).

Two tests should also be foreseen to remove uncertainties:

a first test chooses the largest variation, in other words the highest time constant, if there are variations of CO along several directions in one of the nested matrices, for example in the small 3×3 element matrix M3;

a second test arbitrarily chooses one of two (or more) directions along which the variation of CO is identical, for example by choosing the smallest value of the Freeman code; this case usually arises when the real (oriented) direction of displacement is approximately between two successive coded directions in the Freeman code, for example between directions 1 and 2 corresponding to an (oriented) direction that can be denoted 1.5 (FIG. 6) forming about 67.5° with the x axis direction (direction 0 in the Freeman code).

Determination of the oriented direction and speed of an area in effective movement as described above is done by calculation unit 17a (FIG. 4) associated with unit 17 and which receives the above-mentioned 17×17 outputs of matrix 21, both for CO and for DP (two outputs from 21, namely $S_{0.1}$ and $S_{0.16}$ are shown) Unit 17a processes the values of CO and DP for the successive nested matrices and uses these values to determine the oriented direction (in the Freeman code) and the displacement speed (depending on which of the nested matrices is to be selected), possibly by applying the tests mentioned above.

The scanning of an entire frame of the digital video signal through matrix 21 takes place:

firstly for the group of the first 17 rows or lines, rows 1 to 17, in the frame: from the left of the frame to the right considering relative movement, as shown for frame $TR_2$ in FIG. 5, i.e. from portion $TM_1$ at the extreme left, then $TM_2$ offset by one column with respect to $TM_1$, until $TM_M$ (where M is the number of pixels per frame line or row) at the extreme right;

then similarly, from the left to the right, column by column, for lines or rows 2 to 18 in the frame; and so on, each time going down by one line; line 3 to 19 . . . until the last group at the bottom of the frame, namely lines L–16 . . . L (where L is the number of lines per frame).

Considering FIGS. 2 and 4, it can be seen that the signals delivered by units 17, 18 and 19, in other words the spatial processing assembly, are as follows:

a signal V representing the displacement speed, based on the amplitude of the maximum variation of CO in the identified area, the value of which may be for example represented by a scale of eight integers from 0 to 7 if the speed is in the form of powers of 2, and therefore contains 3 bits;

a signal DI representing the direction of this displacement, deduced from the direction of this maximum variation, the value of DI being also possibly represented by one of the eight values 0 to 7 in the Freeman code, and therefore contains 3 bits;

a validation signal VL specifying that the result for the speed and (oriented) direction is valid, in order to be able to distinguish a valid output with V=0 and DI=0, from the lack of an output due to an incident, this signal being either 1 (valid output) or 0 (no output); therefore, only one bit is necessary for VL;

advantageously, a time constant signal CO, for example containing 3 bits;

(the 3 or 4 signals V, DI, VL, and possibly also CO, delivered by the spatial processing unit 17 and its associated electronics), a delayed video signal SR composed of the input video signal S delayed in the delay unit 18 by 16 consecutive line durations TR and therefore by the duration of the distribution of the signal S in the 17×17 matrix 21, in order to obtain a digital video signal contemporary of the matrix representation in matrix 21, the contents of this signal possibly being displayed in clear on a television set or monitor screen;

all three signals delivered by unit 19, namely clock HP, line sequence SL and column sequence SC signals.

Nested hexagonal matrices (FIG. 8) or an inverted L-shaped matrix (FIG. 9) may be substituted for the nested rectangular matrices in FIGS. 4 and 7.

In the case shown in FIG. 8, the nested matrices (in which only the most central matrices MR1 and MR2 have been shown) are all centered on point MR0 which corresponds to the central point (in which the binary signal is "0") of matrices M3, M9 in FIG. 7. The advantage of a hexagonal matrix system is that it allows firstly to use oblique coordinate axes $x_a$, $y_a$ and secondly a breakdown into triangles with identical sides, to carry out an isotropic speed calculation.

The matrix in FIG. 9 is composed of a single row ($L_u$) and a single column, ($C_u$) starting from the central position $MR_u$ in which the two signals DP and CO respectively are equal to "1" for DP and increase or decrease by one unit for CO, if a movement occurs.

It is thus determined if the direction of (relative) displacement is:

in the direction of the x coordinate: the CO signal is identical in all positions (boxes) in column CU, and the binary signal DP is equal to 1 in all positions in row $L_u$, from the origin $MR_u$, with the value $CO_u$, up to the position in which CO is equal to $CO_u$ +1 or −1 inclusive;

in the direction of the y coordinate: the CO signal is identical in all positions (boxes) in row $L_u$, and the binary signal DP is equal to 1 in all positions in column $C_u$, from the origin $MR_u$, with the value $CO_u$, up to the position in which CO is equal to $CO_u$ +1 or −1 inclusive;

or finally oblique relative to x and y: the binary signal DP is equal to 1 and CO is equal to $CO_u$ in positions (boxes) of $L_u$ and in positions (boxes) of $C_u$, the slope being determined by the perpendicular to the line passing through the two positions in which the signal $CO_u$ changes by the value of one unit, the DP signal always being equal to 1.

FIG. 9 shows the case in which DP=1 and $CO_u$ changes value by one unit in the two specific positions $L_{u3}$ and $C_{u5}$ and indicates the corresponding slope $P_p$.

In all cases, the displacement speed is a function of the position in which CO changes value by one unit.

If CO changes by one unit in $L_u$ or $C_u$ only, it corresponds to the value of the CO variation position.

If CO changes by one unit in a position in $L_u$ and in a position in $C_u$, the speed is proportional to the distance between $MR_u$ and $E_x$ (intersection of the line perpendicular to $C_u$-$L_u$ passing through $MR_u$).

The system described up to now with reference to FIGS. 1 to 9 is advantageously complemented by a supplementary system which will be described with reference to FIGS. 11 to 16 to constitute a global system 22 illustrated in FIG. 10 which represents firstly the assembly 11a in FIG. 2 indicating the V, DI, VL, C and SR and composite F (HP, SL, SC) signals transferred by assembly 11 (which receives the incoming digital video signal S) to assembly 22a (which delivers a composite outgoing signal ZH).

The connection line Z–$Z_1$ between assemblies 11a and 22a is shown in FIGS. 2, 10 and 11, the outputs from assembly 11a being connected to the inputs of assembly 22a along Z–$Z_1$ to transfer the above mentioned signals.

The output delivered by unit 22a and therefore from global device 22 is composed of a composite signal ZH supplying the required information on the area in relative movement in scene 13a monitored by video camera 13.

The complementary unit 22a connected to the outputs of unit 11a is illustrated in FIG. 11 in the form of functional blocks, remembering that this figure is connected along line Z–$Z_1$ (in the upper part) to FIG. 2 along line Z–$Z_1$ (in the lower part of FIG. 2).

The unit in FIG. 11 is composed essentially of a histogram formation and utilization device, and comprises:

a micro-bus line 23 that transports a number of digital signals described in detail below;

six histogram formation and processing blocks or units referenced 24, 25, 26, 27, 28, 29, for the histograms of the signals: delayed digital video SR, speeds V, oriented directions (in Freeman code) D1, time constants CO, first axes x(m) and second axes y(m), respectively;

six linear combination blocks or units 30, 31, 32, 33, 34, 35 combining their inputs from bus 23 each to form a validation signal $V_1$, $V_2$, $V_3$, $V_4$, $V_5$, $V_6$ for the six blocks 24, 25, 26, 27, 28, 29 respectively, 30 being associated with 24, 31 being associated with 25, 32 being associated with 26, 33 being associated with 27, 34 being associated with 28 and 35 being associated with 29;

a moving area block or unit 36 coordinating outputs from blocks 28 and 29 for the x(m) and y(m) axes; and a datum line change block or unit 37 receiving orientation signals $x(m)_0$ and $y(m)_0$ for the x(m) and y(m) axes, as well as pixel clock signals HP, line sequence signals SL and column sequence signals SC (these three signals being grouped together in F bundle in FIGS. 2, 4, 10 and 11) originating from unit 19 in FIGS. 2 and 4, and forming the $x(m)_1$ and $y(m)_1$ signals sent to units 28 and 29 respectively.

Units 24, 25, 26 and 27 each send their SSR, SV, SDI, SDO outgoing signals to bus 23, whereas units 28 and 29 each deliver a signal $x(m)_2$, $y(m)_2$ to the two inputs of the moving area unit 36, which combines these two signals from units 28 and 29 and delivers a composite signal xy(m) onto bus 23.

Operation of each of the histogram formation and processing units 24 to 29, which receive firstly a validation signal $V_1$, $V_2$, $V_3$, $V_4$, $V_5$ or $V_6$, from the associated linear combination unit 30 to 35, and secondly an SR, V, DI, CO, $x(m)_1$ or $y(m)_1$ signal to be processed as input, is the same, and this is why only the operation of one of these units, namely unit 25 for the formation and processing of speed histograms V, taken as an example, is described; the only difference for the other analog units 24, 26, 27, 28 and 29 is the variable that is processed, noting that the different incoming signals for the six units 24 to 29 are all digital signals, which enables a similar structure and operation of these six units.

FIG. 12 diagrammatically represents the envelopes of histograms 38 and 39, respectively in x and y (cartesian coordinate axes of the 17×17 element matrix 21 in FIG. 4), of the speeds V of the area in displacement (in FIG. 14, elements such as $C_1$, $C_2$ of the histogram envelope 38 are shown); $x_M$ and $y_M$ represent the x and y coordinates of the maxima of the two envelopes 38 and 39 respectively, whereas $l_a$ and $l_b$ for the x axis and $l_c$ and $l_d$ for the y axis represent the limits of the range of significant or interesting speeds, $l_a$ and $l_b$ being the lower limits and $l_b$ and $l_d$ being the upper limits of the significant portions of the histograms.

The vertical lines $L_a$ and $L_b$ of abscissas $l_a$ and $l_b$ and the horizontal lines $L_c$ and $L_d$ of ordinates $l_c$ and $l_d$ form a rectangle that surrounds the cross hatched area 40 of significant speeds (for all x and y directions), a few microareas 41 with lower speeds, and which will be ignored, exist close to the main area 40.

Therefore, all that is necessary to characterize the area with the largest variation of the parameter shown in the histogram, the speed V in this particular case, is to identify the coordinates of the four limits $l_a$, $l_b$, $l_c$ and $l_d$ and the two maxima $x_M$ and $y_M$. Block 25 continuously delivers this information concerning V onto the micro-bus 23.

Similar blocks 24, 26 and 27 continuously deliver information concerning the area of the maximum value for SR, DI and CO, onto this micro-bus 23 in the same way.

Finally, similar blocks 28 and 29 continuously deliver information concerning the area of the maximum value of $x(m)_1$ and $y(m)_1$ respectively to unit 36, which combines this abscissa and ordinate information referenced $x(m)_2$ and $y(m)_2$ respectively into a composite signal xy(m) that is sent through the output of unit 36 onto bus 23.

Eventually, bus 23 transfers information concerning the area containing the maximum values of SR, V, DI, CO and xy(m), in other words $x(m)_1$ and $x(m)_2$, to determine if there is a moving area in the scene observed by the video camera 13, to localize this area and to determine the displacement speed and (oriented) direction.

In FIG. 11, the composite outgoing signal available on bus 23 is denoted ZH. The above mentioned components of this signal ZH, particularly for V and DI, in other words the speed and oriented direction of the moving area, may be displayed in digital or analog form, may produce a light signal and/or a buzzer, particularly if the speed V exceeds a limit, or they may be transmitted, by cable, optical fiber or radio relay for remote applications, to a control unit, such as unit 10a in FIG. 1, located close to or remote from device 11 according to the invention.

The portion of the units in FIG. 12 above bus 23 is used, following the point by point processing of an entire frame and the association of points in a frame, to deduce an external global value, to determine if there is an area in the observed scene in relative movement, and if so to localize it, and furthermore, if this area is actually moving, to determine the speed and oriented direction of this displacement. This area in relative movement is identified in the observation plane along two directions x, y which are not necessarily orthogonal (for example in the application in FIGS. 15 and 16), and is made by the portion of the units in FIG. 12 under bus 23.

We will now describe the structure and operation of a histogram formation and processing block, such as 25, and of its associated linear combination block, such as 31, in more detail, with reference to FIGS. 12, 13 and 14.

Block 25 (FIG. 13) includes a portion 25a forming the histogram and a portion 25b forming a classifier for the histogram, these two portions operating under the control of software materialized as a portion of the integrated circuit 25c which extracts the limits $l_a$, $l_b$, $l_c$, $l_d$ of the histogram (FIG. 11).

The classifier 25b, as well as classifiers of other histogram formation and processing blocks 24, 26, 27, 28, 29 (for the latter, two through the x(m) and y(m) combination unit 36), delivers its output information to bus 23, and, via said bus, to the linear combination unit 31, which therefore receives information in parallel from all classifiers in units 24, 25, 26, 27, 28, 29 and which, as a function of this information, delivers or not the validation signal $V_2$ to unit 25.

Using software 25c, the classifier 25b determines the various classes (each containing the same number of speed values in the case considered) that will define the envelope such as 38 or 39 (FIG. 12).

FIG. 14 shows the successive classes $C_1, C_2 \ldots C_{n-1}, C_n$, along the x axis, together with their envelope 38 for the speed V, that are determined in classifier 25b.

FIGS. 15 and 16 illustrate the part taken by histograms for x(m) and y(m) formed by units 28 and 29 and combined in unit 36 in order to obtain a slope.

For example, we have considered the case of observing a road using a video camera with digital output located onboard a vehicle with its associated device according to the invention.

FIG. 15 shows the two road sides $B_g$ at the left and $B_d$ at the right of the road R, as well as the slopes of the projection $P_x$ relative to x(m) done by unit 28 and the projection $P_y$ relative to y(m) done by unit 29, slopes numbered for example from 0 to 7 (using a convention other than the Freeman code).

In order to give the best precision concerning the right side $B_d$, in other words maximum sensitivity of the indications (for example speed) concerning this side, the projection $P_x$ should have a slope as close as possible to the optimum slope $P_0$ which is perpendicular to $B_d$, and particularly slope 5 in the representation shown in FIG. 15. The maximum value of the speed histogram will therefore be obtained for the slope 5 determined by unit 28 (FIG. 11).

The same reasoning is applicable to the left side $B_g$ concerning the slope of the projection $P_y$ and therefore the part taken by of unit 29.

The unit 36 combining the optimum two slopes supplies optimization information for the two sides $B_d$ and $B_g$.

FIG. 16 illustrates an application to determine the optimum slope $P_0$ of the projection $P_x$, taken for example, for satisfactory driving of a vehicle Vh in continental Europe when driving on the right side of the road (case a), or in the United Kingdom when driving on the left side of the road (case b), and finally of an aircraft Va for correct landing in the middle of an airport runway (case c).

Consequently, in order to assist in driving a land vehicle (car, truck) on a road or in flying an aircraft (airplane, space shuttle) close to an airport runway, the device according to the invention further includes means of representing the right and left sides Bd and Bg respectively of the road or the runway, and means of orienting at least one of the coordinate axes, with variable slope, so that it remains approximately orthogonal to the corresponding side (position $P_0$).

Up to now, we have concentrated on describing means of determining an area in effective displacement in an approximately motionless environment by means of detecting a region in which DP=1. In order to determine an area not moving in an environment in which the background is moving (for example a broken-down vehicle or a crash on a motorway), the opposite situation occurs in which areas wherein DP=0 must be localized with respect to the environment in which DP=1. Obviously in this case, speeds will be zero in one area and the concept of direction will be meaningless. Therefore, the calculations in 17a will be different.

The device according to the invention, if it is only to be used to determine an immobile area, can be simplified with the elimination of units or blocks processing speeds and directions, particularly blocks 25, 26, 31, 32 and the number of outputs from unit 11a and inputs to unit 17 can be reduced.

In the operation unit 10a of a device according to the invention, means of displaying histograms and/or values of the DP or CO signals on a monitor screen may be provided.

The SR signal, namely the delayed digital video signal, is usually applied to a television or monitor screen 10 in order to display this signal locally or remotely on the screen, at the same time as a relative movement is signaled in order to verify the nature of this relative movement. Therefore, it is only necessary to look at the television or monitor screen 10 when a area in relative displacement has been signaled, for example by a visual alarm and/or buzzer.

It is useful to facilitate identifying an area in relative movement on the screen by imposing arbitrary colors on the delayed digital video signal SR, each color or color grade representing a movement speed and/or direction.

The various units that have been described with reference to FIGS. 2, 3, 4, 11 and 13 are each constituted by a known type of electronic circuit, particularly with microprocessors carrying out calculations and/or comparisons or using scanning signals; memories; delay units; shift registers; units forming linear histograms and associating this type of histograms in the plane; and microbuses.

The combination of these electronic circuits, in separate units 11a or 22a or in an assembly 22 composed of 11a and 22a, may be done using two very small integrated circuits or a single very small integrated circuit, with a size of the order of 10 mm×10 mm for example using 0.7 μm technology, the set of the two interconnected integrated units or the single integrated circuit being connected through its input to the digital video output of a video camera or other observation device and through their outputs to one or several local or remote utilization devices. In one variant, if the simplified device in unit 11a only is used, this device, preferably in the form of a single integrated circuit, is placed between said digital output and one or several local or remote utilization devices.

We will now give examples that are in no way restrictive of additional applications of a device according to the invention, particularly the device according to FIGS. 1 and 10, in other words according to the assembly shown in FIGS. 2 and 11 as connected along line Z–Z$^1$.

A first additional application shown in FIG. 17 is constituted by the automatic framing of a person moving in a room, for example during a video conference. Automatic framing eliminates the movements of the person moving around, which increases the definition of the image of this person observed by a video camera with a digital output and also, if the digital video signal is compressed, simplifies this compression.

FIG. 17 shows a video camera 13 of the above-mentioned type that observes the person P who can move about. The digital video signal S from the video camera is transmitted by cable, optical fiber or radio relay to a television or monitor screen 10b, but is also received by the device 11 according to the invention, and the ZH output of this device acts on a unit 42 which, in response to signals received from device 11 concerning the position and movement of person P, controls the motors 43 of said camera 13 to direct the optical axis of the camera towards the person and particularly towards his face as a function of the location, speed and direction of his movement, possibly varying the zoom setting, the focal distance and/or the focusing of the camera if the person P moves forwards or backwards.

It is also possible to control movements of one or more spotlights on a person (actor, singer) on a stage, the device according to the invention centering the person at the center of the image by varying the orientation of the video camera and controlling the direction of the spotlight, for example by one or two rotatable mirrors for each spotlight.

Another example of application of the device according to the invention is illustrated in FIG. 18, which shows the camera 13 or other observation device that outputs a digital video signal S to a device 11 according to the invention. In this application, the camera 13 monitors part of a motorway (highway) in order to detect an unexpected stop of a vehicle, particularly on the hard shoulder, or if a car is stopped following a collision.

Therefore, the objective in this case is to determine whether or not an object (the vehicle) is immobile in a moving environment (other vehicles), in other words to localize the area in which DP=0 in the 17×17 element matrix 21. Normally, the camera 13 observes a vehicle stream that produces DP=1 responses, with speed and displacement direction values. However, if a vehicle stops, it is identified by a DP=0 response in its observation area.

A unit 44 receiving both ZH and SR detects the occurrence of a area in which DP=0 in ZH and outputs an error signal NL which firstly trips a buzzer and/or a visual alarm in a device 45, and secondly controls a switch 46 which applies the video signal S (or rather the delayed video signal SR) on a television or monitor screen 10 which enables the supervisor, alerted by the buzzer and/or visual alarm, to observe the motorway when a vehicle stops or a collision occurs in order to take the necessary measures, for example depending on the reaction of the driver of the vehicle which stopped.

Using the invention, a supervisor in a monitoring station can easily control a large number of segments on a motorway (or a main road) for each of which there is a camera 13 and a device 11 according to the invention, the ZH and SR outputs from each device 11 being transmitted by cable, optical fiber or radio relay to a single supervision station at which there is a common unit 44; the observer only needs to look at the screen in 10 if there is an incident or accident signaled by the alarm, and it is unusual that several incidents and/or accidents occur simultaneously at different locations.

In particular, unit 44 may include, at its input, a rotary type switch (not shown) sending the ZH (and SR) signals from the various assemblies 13-11 located along the motorway successively and cyclically onto the portion of this unit 44 producing the NL signal.

The same system allows to detect not only if a vehicle is stopped, or a collision causing vehicles to stop takes place, but also a reduction in the speed of the stream of vehicles (for very slow traffic), due to the reduction of the speed in the various areas in which D=1 and conversely a vehicle traveling at very high speed, the speed in the area observed then exceeding the allowable speed limit.

Finally, FIG. 19 illustrates another application of the invention, namely man-machine interaction, by movement of a hand M or more particularly fingers DG inside an area SF broken down into rectangles by a coordinates system $C_x$ and $C_y$.

A video camera 13 with a digital output, associated with a device 11 according to the invention as shown in FIG. 1, can be used to recognize the movement of a hand M and fingers DG and can be used to control a computer (for example like a "mouse") or to control some functions in a machine. For example, the assembly 13-11 could be utilized by a deaf-dumb person, using the standard deaf-dumb sign language based on hand movements, to input alphanumeric data and therefore a text into a computer without needing to use the normal keyboard; this operation, which can also obviously be carried out by a speaking person who has learnt the deaf-dumb language, allows entry of a text into a computer without needing to use the keyboard. This type of system is not sensitive to time variations and does not require precise signaling of the start and end of the gesture.

FIGS. 20 and 21 diagrammatically illustrate application of the invention to surveillance of a car driver to signal if he falls asleep.

In this case, video camera 13 is placed adjacent to the bodywork inside the vehicle, for example above the rear-view mirror, where it can observe the driver.

The first operation is to frame the driver, in the same way as for the application in FIG. 17. FIG. 20 diagrammatically shows the image 1C of the driver on the video screen. Firstly, the useless right and left portions are eliminated (as represented by the horizontal cross-hatching of the image), thus restricting processing to the central part of the image between these two portions.

Then, within this central portion, it suffices to monitor the unhatched area AA of FIG. 21 framing the head.

The relevant displacements that are detected by the device according to the invention consist of the driver blinking (signaled by vertical movements in area AA), at a rate that changes just before he falls to sleep. If his blinking rate or speed drops below a certain threshold, a buzzer sounds and the driver is woken up.

FIG. 22 shows a means of getting around the limited number of p bits representing the time constant CO when it is necessary to take into account a wider range of displacement speeds.

Mallat's diagram will be used for this purpose (see article by S. Mallat "A Theory for multiresolution signal decomposition" in IEEE Transactions on Pattern Analysis and Machine Intelligence, July 1989 p. 674–693) which consists of successively breaking down the entire video image into successive halves, identified 1, 2, 3, 4, 5, 6, 7. This creates a compression that only processes portions of images. Thus with p=4, in other words $2^p=16$, we can determine a speed within a wider range.

If initially, within the framework of the entire image, the device according to the invention indicates that the speed of the mobile object (in the broad sense of the term) exceeds the maximum speed determinable with $2^p=16$ for the time constant, all that is necessary is to use partial observed images 1, 2, 3, 4, . . . until the speed of the mobile object does not exceed said maximum speed within the frame of the partial image after compression.

All that is necessary for utilizing the Mallat composition by wavelets is to insert a unit 13A (illustrated in FIG. 22) in the diagram in FIG. 1, to perform this video signal compression. For example, this unit could be composed of the "DV 601 Low Cost Multiformat Video Codec" component made by the ANALOG DEVICES, an American corporation, described in the "ADV 601 Preliminary Data Sheet", January 1996. FIG. 2 shows an optional compression unit of this type 13a.

Finally, the number of bits (1, 3 (if p=3), 8, 15) transported on some microbuses have been shown in FIGS. 2 and 3, which demonstrates the possible size savings for the various functional blocks as they process a reduced number of bits.

It is quite clear that the invention is capable of detecting a relative movement in a scene observed by an opto-electronic device such as a video camera which transmits the observed scene in the form of a digital video signal composed of a succession of frames, themselves composed of a succession of lines composed of a succession of pixels, this digital signal being analyzed in order to identify an area in relative displacement, with indication of the speed and (oriented) direction of this displacement if the area is in effective movement with respect to an approximately motionless environment.

Given that the device according to the invention determines the oriented direction and the displacement speed of an object (in the broadest sense of the term), means may be combined with it to use these two parameters to deduce a future position of the objects at a given instant, and to direct in advance the input video camera 13 in direction of this future position.

Note that the results obtained with the device according to the invention in no way require that the camera should be fixed, so that the camera and the, associated device may be put onboard a land, air or sea vehicle (for example for embodiment of the process illustrated in FIG. 16).

After a very short initialization period equal to N (of the order of 10 corresponding successive frames), the device according to the invention determines the relative displacement parameters instantaneously after the end of each frame on which the temporal and spatial processing was performed, due to the recursiveness of calculations according to the invention.

We have described a preferred embodiment of the device according to the invention and a few of its applications. Obviously, this embodiment and these applications have been given as non-restrictive examples, and many variants and adaptations that will be obvious to the expert in the field may be envisaged without going outside the scope of the invention as defined in the following claims.

For example, it would be possible to implement methods of using signals delivered in output by unit 11 in FIG. 2 other than those illustrated in FIG. 11 without going outside the scope of the invention.

As concerns the applications of a device according to the invention, they are in no way limited to those given as examples in the description above. Thus, a circuit similar to that in FIG. 17 may be associated directly with a camescope or video camera to stabilize it for compensating for displacements caused by accidental movements of the user.

It would also be possible to use one or preferably several devices according to the invention, associated with one or preferably several camescopes or video cameras with a digital video output placed in a room in a building, to create an "intelligent room" by means of such a system capable of detecting and localizing the presence and movement of one or several persons in the room, analyzing this movement for security or identification purposes and/or of helping in tasks to be accomplished, for example, or of watching children in another room or customers in a supermarket.

It has been assumed especially that a video signal is used with pairs of successive interlaced frames, particularly during the discussion of the memory capacity 16, with processing of the two frames in a pair in the device according to the invention. However, it would be possible to use only one frame out of two (for example the odd frame) reducing the memory capacity, but also reducing the speed at which the required information is obtained by about half. It would also be possible to use a video camera or another observation device for which the digital output only includes one frame per image.

In some applications, it is possible to associate specialized sensors with the device according to the invention, for example one or several acceleration sensors, to be able to process additional displacement parameters.

Obviously, the invention is not limited to the particular embodiments or applications described, but it includes all variants and modifications included part of the general definition of the invention.

The invention claimed is:

1. A process of smoothing an input signal, the input signal comprising a succession of frames, each frame comprising a succession of pixels, the process comprising:
   for each pixel of the input signal:
   smoothing the pixel using a time constant (CO) for such pixel, thereby generating a smoothed pixel value (LO); and
   determining whether there exists a significant variation between the value of the pixel and the value of the same pixel in a smoothed prior frame.

2. The process according to claim 1 wherein:
   determining the existence of a significant variation for a given pixel comprises determining whether the absolute value of the difference (AB) between the given pixel value (PI) and the value of such pixel in a smoothed prior frame (LI) exceeds a threshold (SE); and
   smoothing the input signal comprises, for each pixel;
   modifying the time constant (CO) for the pixel to be used in smoothing the pixel in subsequent frames of the input signal based upon the existence of a significant variation, and
   determining a smoothed value for the pixel (LO) as follows:

$$LO = LI + \frac{PI - LI}{CO}.$$

3. The process according to claim 2 wherein the time constant (CO) is in the form $2^p$, and wherein p is incremented in the event that AB>SE, and wherein p is decremented in the event AB>SE.

4. The process according to claim 3 wherein p is incremented or decremented by one.

5. The process according to claim 2 further comprising generating an output signal comprising, for each pixel, a binary value (DP) indicating the existence or non-existence of a significant variation, and the value of the time constant (CO).

6. The process according to claim 5 wherein the binary values (DP) and the time constraints (CO) are stored in a memory sized to correspond to the frame size.

7. The process according to claim 1, further including modifying the time constant (CO) for such pixel to be used in smoothing the pixel in subsequent frames of the input signal based upon the existence or non-existence of a significant variation.

8. The process according to claim 1, wherein determining the existence of a significant variation for a given pixel comprises detennining whether the absolute value of the difference (AB) between the given pixel value (PI) and the value of such pixel in a smoothed prior frame (LI) exceeds a threshold (SE).

9. The process according to claim 8, wherein smoothing the input signal comprises, for each pixel:
   determining a smoothed value for the pixel (LO) as follows:

$$LO = LI + \frac{PI - LI}{CO}.$$

10. An apparatus for smoothing an input signal, the input signal comprising a succession of frames, each frame comprising a succession of pixels, the apparatus comprising:
    means for smoothing each pixel of the input signal using a time constant (CO) for the pixel, thereby generating a smoothed pixel value (LO); and
    means for detennining, for each pixel, the existence of a significant variation for between the value of the pixel and the value of the same pixel in a prior smoothed frame.

11. The apparatus according to claim 10 wherein:
    the means for determining the existence of a significant variation comprises means for determining whether the absolute value of the difference (AB) between the pixel value (PI) and the value of the pixel in a smoothed prior frame (LI) exceeds a threshold (SE); and
    the means for smoothing the input signal comprises:
    means for modifying, for each pixel, the time constant (CO) for the pixel based upon the existence of a significant variation, and
    means for determining, for each pixel, the smoothed value for the pixel (LO) as follows:

$$LO = LI + \frac{PI - LI}{CO}.$$

12. The apparatus according to claim 11 wherein the time constant (CO) is in the form $2^p$, and wherein p is incremented in the event that AB>SE, and wherein p is decremented in the event AB>SE.

13. The apparatus according to claim 10 further comprising means for generating an output signal comprising, for each pixel, a binary value (DP) indicating the existence or non-existence of a significant variation, and the value of the time constant (CO).

14. The apparatus according to claim 13 further comprising a frame-size memory, wherein the binary values (DP) and the time constants (CO) are stored in the memory.

15. The apparatus according to claim 10, further comprising means for modifying the time constant (CO) for the pixel to be used in smoothing the pixel in subsequent frames of the input signal based upon the existence of such significant variation.

16. The apparatus according to claim 10, wherein the means for determining the existence of a significant variation comprises means for determining whether the absolute value of the difference (AB) between the pixel value (PI) and the value of the pixel in a smoothed prior frame (LI) exceeds a threshold (SE).

17. The apparatus according to claim 16, wherein the means for smoothing the input signal comprises means for determining, for each pixel, a smoothed value for the pixel (LO) as follows:

$$LO = LI + \frac{PI - LI}{CO}.$$

* * * * *